US008744908B2

(12) United States Patent
Kalb et al.

(10) Patent No.: US 8,744,908 B2
(45) Date of Patent: Jun. 3, 2014

(54) SYSTEM AND METHOD FOR MANAGEMENT AND OPTIMIZATION OF OFF-LINE ADVERTISING CAMPAIGNS WITH A CONSUMER CALL TO ACTION

(75) Inventors: Kenneth J. Kalb, Solana Beach, CA (US); Mark H. Schwartz, Livonia, MI (US); Thomas H. Buscher, Los Angeles, CA (US)

(73) Assignee: Analog Analytics, Inc., Solana Beach, CA (US)

( * ) Notice: Subject to any disclaimer, the term of this patent is extended or adjusted under 35 U.S.C. 154(b) by 37 days.

(21) Appl. No.: 13/231,914

(22) Filed: Sep. 13, 2011

(65) Prior Publication Data

US 2012/0179536 A1 Jul. 12, 2012

(51) Int. Cl.
*G06Q 30/00* (2012.01)
(52) U.S. Cl.
USPC ...................................................... 705/14.41
(58) Field of Classification Search
USPC ...................................................... 705/14.43
See application file for complete search history.

(56) References Cited

U.S. PATENT DOCUMENTS

| 7,949,563 | B2 * | 5/2011 | Collins ....................... 705/14.43 |
| 8,284,061 | B1 * | 10/2012 | Dione ......................... 340/572.1 |
| 2004/0122735 | A1 | 6/2004 | Meshkin |
| 2006/0053050 | A1 | 3/2006 | Schweier |
| 2006/0122879 | A1 | 6/2006 | O'Kelley |
| 2006/0190330 | A1 | 8/2006 | Tollinger et al. |
| 2007/0027768 | A1 * | 2/2007 | Collins et al. ................... 705/14 |
| 2007/0038516 | A1 | 2/2007 | Apple et al. |
| 2008/0249855 | A1 * | 10/2008 | Collins et al. ................... 705/14 |
| 2008/0270233 | A1 | 10/2008 | Yip et al. |
| 2009/0106100 | A1 | 4/2009 | Mashinsky |
| 2009/0157511 | A1 | 6/2009 | Spinnell et al. |
| 2010/0138303 | A1 | 6/2010 | Preston et al. |
| 2010/0318407 | A1 * | 12/2010 | Leff et al. ....................... 705/10 |

FOREIGN PATENT DOCUMENTS

WO 2006115911 A2 11/2006

OTHER PUBLICATIONS

U.S. office action dated Sep. 21, 2011 issued in parent U.S. Appl. No. 12/009,280 cites the U.S. patent application publications listed above.

* cited by examiner

*Primary Examiner* — Thomas Dixon
(74) *Attorney, Agent, or Firm* — Morgan Lewis & Bockius LLP

(57) ABSTRACT

An improved method for managing advertising campaigns is provided. The method includes defining an advertising campaign, uploading a multi-media file of each member of the campaign; linking each of the multi-media files of the advertisements and associating the media files with a data capture template based on the media type; configuring the scheduling and promotion details for display of the media ad; associating survey questions with respondent incentives; calculating the present cost of the campaign; capturing consumer responses to individual members of the campaign; aggregating and analyzing the cumulative responses; making program adjustments to the type, location, and schedule for the campaign members based on these real-time results; and transmitting the revised campaign management instructions and adjusted media files to remote systems at the media channels thereby optimizing in real-time the overall ad campaign.

10 Claims, 36 Drawing Sheets

| Campaign | Off Line Ad | Location | Schedule | Creative | Analytics | TXT Marketing |

Setup  System Log  Help  Logout

Search [____] GO

Campaign
Starbucks Fall Flavors            00123                                                    Help Contact  Murray Goldstein              Tel  619-249-0665
Driver Type  Agency                    Email  family@TXT4info.com
Client  JWT Advertising Agency
Campaign Type  Newsprint

| Create | Edit | Save | Delete |

FIG.15

Setup   System Log   Help   Logout

| Off Line Ad | Location | Schedule | Creative | Analytics | TXT Marketing | Search | GO |

Campaign Group
Starbucks
Fall Flavors

Agency
JWT Advertising Agency

Off-Line Advertisement
HOME                                                                                                    Help

| Advertisement | Type of Ad | Publisher | Market Segment | Sub Market Segment | Media Buy | Media Cost |
|---|---|---|---|---|---|---|
| △ Drink Latte | TV | CBS | Food | Health | 30 second spot | $50,000 |
| Latte Spring Flavors | Radio | KNBC | Food | Health | 15 second spot | $10,000 |
| Pumpkin Expresso | Newsprint | New York Times | Food | Health | Full Page | $5,000 |

| Create | Edit | Save | Delete |

FIG.16

| Campaign | Off Line Ad | Location | Schedule | Creative | Analytics | TXT Marketing |

Setup  System Log  Help  Logout

Search [ ] GO

Campaign Group
Starbucks
Fall Flavors

Agency
JWT Advertising Agency

Off-Line Advertisement
Drink Latte                    5698                                         Help Advertisment  Drink Latte
Type of Ad    TV                              Media Buy   30 Second Spot
Publisher     CBS                             Media Cost  $50,000.00
Market        Food
Sub Market    Health

| Create | Edit | Save | Delete |

FIG.17

| Off Line Ad | Location | Schedule | Creative | Analytics | TXT Marketing | | Setup System Log Help Logout |
|---|---|---|---|---|---|---|---|
| | | | | | | Search | GO |

Campaign Group
Starbucks
Fall Flavors

Agency
JWT Advertising Agency

Off-Line Advertisement
HOME     Help

| Advertisement | Type of Ad | Publisher | Market Segment | Sub Market Segment | Media Buy | Media Cost |
|---|---|---|---|---|---|---|
| △ Drink Latte | TV | CBS | Food | Health | 30 second spot | $50,000 |
| Latte Spring Flavors | Radio | KNBC | Food | Health | 15 second spot | $10,000 |
| Pumpkin Expresso | Newsprint | New York Times | Food | Health | Full Page | $5,000 |

| Create | Edit | Save | Delete |
|---|---|---|---|

| | | | | Setup System Log Help Logout |
|---|---|---|---|---|
| Off Line Ad | Location | Schedule | Creative | Analytics | TXT Marketing | Search [ ] GO |

Campaign Group
Starbucks
Fall Flavors

Agency
JWT Advertising Agency

Off-Line Advertisement
HOME                                                                                          Help

| Advertisement | Type of Ad | Publisher | Market Segment | Sub Market Segment | Media Buy | Media Cost |
|---|---|---|---|---|---|---|
| ▷ Drink Latte | TV | CBS | Food | Health | 30 second spot | $50,000 |
| Latte Spring Flavors | Radio | KNBC | Food | Health | 15 second spot | $10,000 |
| Pumpkin Expresso | Newsprint | New York Times | Food | Health | Full Page | $5,000 |

| Create | Edit | Save | Delete |
|---|---|---|---|

FIG.22

| | Off Line Ad | Location | Schedule | Creative | Analytics | TXT Marketing |
|---|---|---|---|---|---|---|

Setup  System Log  Help  Logout

Search [____] GO

Campaign Group
Starbucks
Fall Flavors

Agency
JWT Advertising Agency

TXT Marketing Campaign — Help

TXT Marketing Campaigns Ad / Info

| Keyword | Short Code | Status |
|---|---|---|
| Latte | 22523 | Active |

TXT Message — Help

Marketing Details
  Start Date
  End Date
  Attach File
  File Name
  TXT Message
STOP TXT Message
HELP TXT Message

TXT Message Details — Help

Message Instructions

TXT Message Status — Help

Short Code 2252
Keyword Latte
Sub Keyword Latte NY
Total Messages
Messages Used
Start Date
End Date

FIG.24

SYSTEM AND METHOD FOR MANAGEMENT AND OPTIMIZATION OF OFF-LINE ADVERTISING CAMPAIGNS WITH A CONSUMER CALL TO ACTION

This patent application is a continuation-in-part of U.S. patent application Ser. No. 12/009,280 filed on Jan. 17, 2008 which is incorporated by reference herein in its entirety.

BACKGROUND OF THE SYSTEM

1. Field

This disclosure relates to systems and methods for automating or managing business practices. More particularly, this disclosure relates to automation of the business practice of market analysis and demand surveying especially for optimization of advertising campaigns. This disclosure also relates to usage of short message services and other signaling methods for improving the effectiveness of surveys of public sentiment.

2. Background

The statements in this section merely provide background information related to the present disclosure and may not constitute prior art.

Need for Measuring Off-Line Advertising Efficiency

The combined cost of advertising products by both manufacturers and retailers has reached such prevalence that well over $100 billion is now being spent on a yearly basis between the analog media of TV, radio, newsprint, magazines, and outdoor billboards. The sophisticated development efforts invested into the advertising content is so high that the industry judges its own work products as an art form. Multiple advertising organizations grant awards to recognize achievement of intangible goals including for example creative excellence and innovation in advertising (www.clioawards.com). While conventional advertising on analog media is large and established, these off-line formats are quickly losing share to on-line advertising. The fraction moving to the internet is growing so quickly that on-line advertising's share of total media ad spending will more than double, from 6 percent in 2006 to over 12 percent share in 2010, and more than 13 percent in 2011. (http://www.emarketer.com/Article.aspx?id=1005549)

However, as favorable as this market share situation is for commercial websites and on-line media, the parasitic growth in internet advertising is becoming disastrous for conventional media. Many newspapers and radio stations are facing a budgetary crisis due to a loss of advertising revenues. The reason for their loss in market share is for the most part due to the fact that these analog media types cannot provide real accountability for advertising campaign performance. Because of this deficiency, advertisers are spending their marketing dollars in channels with knowable performance.

Weakness in Prior Art Assessment of Off-Line Media Audiences

Advertising in traditional off-line media such at TV, radio, newsprint and billboards is inherently unaccountable. More often than not, there is no direct relationship between what is advertised and how much is actually seen by a viewer. For example, a magazine's circulation count is nothing more than a representation of a potential audience. It has little to do with who has seen an advertisement, when, for what period of time and whether the reader is in a demographic an advertiser is trying to reach. Unlike on-line advertising or advertising on the internet, which is inherently quantifiable and measurable, off-line advertising is in fact a faith-based business that until now has been held unaccountable for its performance.

Nielsen Media Research (www.nielsenmedia.com) has produced measures of the TV audiences since the 1950's. But the means that Nielsen and their competitors employ to account for viewer numbers and sentiment are difficult to implement and can be burdensome on audience members. In the past, in order to compile circulation counts, Nielsen has asked viewers to participate by filling out a diary of the programs watched in their home for a one week period.

Such physical measurement means which attempt to gain accurate statistics by capturing a statistically significant sample are based upon pre-selected and fixed populations and therefore arguably are not fully representative of the true or complete audience. These means may record some values regarding viewer-ship numbers, but they are not fully accountable in terms of quantifiable measures of reaction to the advert, much less emotional reaction to the advertised product. Moreover, although there is an array of disparate approaches such as sampling, surveying, polling and the like, there is no large network-centric scalable model for the complete control of off-line analog advertising assets in such a way that can be easily measured across multiple media and in real-time anywhere in the world.

Need for More Effective Advertising Methods

Internet based advertising has had a significant impact on the sales of advertisements made in conventional media. In order to make up for loss of advertising revenues to Internet based media, and also giant mega-advertising channels such as Google, conventional media need ways to maximize the value of their strengths or actually leverage their existing size and ubiquity advantages.

Because internet measurement tools are being constantly developed, on-line advertising is increasing at the expense of off-line advertising. This situation will only become worse for the conventional media channels if no changes can be instituted. There therefore exists a need for new tools to assist off-line media channels to become more efficient with measurement and management of their own advertisements.

Consumers are increasingly willing to adopt technological means to decrease their costs and leverage their time and influence as a potential customer. Influence of new technologies on customer spending habits is evidenced by the decrease in sales of hard copies of music or CD's by strictly electronic or MP3 based formats. Likewise consumers are less willing to pay for hard copy magazine and newspaper subscriptions and are becoming accustomed to not paying for this print content as they download identical but free electronic copies over the internet. Conventional advertising channels are therefore looking for new and more efficient ways to pull customers to their media types.

Prior Art in Advertising Optimization

Historically, probably the most prevalent means to attract customers to a particular product or retail establishment has been through creative advertisements. However the ubiquity of advertisements has also become one of its weaknesses. This is because the massive amount of directions and sources which constantly are presented to potential consumers has tended to desensitize them to all but the most effective pitches. Good or service providers attempt to improve their chances of getting in front of the target populations with their desired demographics by mounting a multi-pronged advertising campaign. An advertising campaign typically includes, for example, commercials on broadcast and cable television, 15 second radio spots, a newspaper ad run daily, and magazine advertisements running monthly.

In order to increase interest by audience members in viewing constituent ads of the campaign, vendors or good or service providers often include a special promotion within the ad. Such offers or discounts within ads have also become so commonplace that consumers have come to expect and assume their existence and this has led to the lessening of their individual impact on viewer interest. So too, the perpetual existence of special offers and discounts has negatively impacted the bottom line economics of the vendors. Therefore, advertising becomes a black hole into which corporate profits are being subsumed. Moreover the appearance of over hyped sales may discount the actual image of the company or associated brand in the eyes of the consumers.

Need for Improved Off-Line Advertising Campaigns

The purpose for setting up an off line advertising campaign is to monitor, analyze and ultimately optimize the performance of the advertisements contained within the campaign. Each campaign can have multiple advertisements and importantly each campaign name can be associated with many different media buys. So for example, an off-line advertising campaign might be called "Fall Flavors" could be created for Starbucks and be placed in newspapers advertisements, magazines, and radio. Also, there can be many different newspaper ads being purchased with different advertising rates and frequencies.

Moreover, each type off off-line advertising campaign, be it TV, radio, newsprint, magazine, or billboards and; kiosks will have certain types of media buys or implementations. For example, media buys in TV may be for purchasing "spot" ads. These ads may last between 15 to 30 seconds depending upon the television network, time of day, etc. Radio spot ads will generally last a shorter time (i.e. 5 or 10 seconds), but in both cases the ads will have a defined duration and a specific frequency of broadcast. The frequency pertains to how often each ad runs a day or week or month. TV and radio spot ads might for example run several times a day, once a day or weekly.

Prior Art in Off-Line Advertising Campaigns

The off-line advertising campaign is for the most part a necessary component of sales for a vendor, merchant, manufacturer, or supplier, any of whom frequently need to make a placement distribution. But it remains a component which is for the most part un-measurable and therefore generally unknowable in its ultimate value or impact on the bottom line of sales or especially marketing image. Moreover, most multi-channel campaigns are difficult to evaluate and manage because of their widespread nature. There is no overall tool which allows the viewing of the individual campaign components while at the same time allowing their speedy control and modification. Therefore, the burden of running an advertising campaign generally overwhelms attempts to completely organize them by either advertising agencies or good or service suppliers themselves.

In all cases, the purpose of quantifying the cost of the media buy, frequency, and media venue is to arrive at a cost per click for the media purchase. Although this unit of measurement is extremely common in the on-line world, it is virtually non existent in the off-line world. Therefore a need exists to provide this data to advertisers. An advertiser or publisher will be able to correctly value the specific ad within the media venue when armed with this information.

Improving the ease of the conduction of off-line advertising campaigns while also imbuing them with more accurate control requires faster feedback and analysis of consumer sentiment, and faster methods for incorporating results from customer interactions. These factors have led prior inventors to try to surmount these problems for example by improving the analysis of the efficiency of advertisements, the typing of customers, and improving the speed of making rate calculations.

FIG. 1 illustrates a functional overview of the participant interactions and management operations that currently are typically practiced during the conduction of advertising campaigns utilizing conventional media. FIG. 1 shows a good or service provider process 110, a creative process 120, a media process 130, and a customer process 140. FIG. 1 indicates, for prior art, the parties necessary for each phase of management of an advertising campaign 100. A vendor 4 or manufacturer 6 works with an advertising body 8 to create creative or advertising media content 10. This advertisement may take the form of a print ad in a newspaper or magazine 12, a multi-second spot on a radio station 14, or a commercial on broadcast or cable television 16. The vendor 4 or manufacturer 6 then collaborates with the advertising body 8 to select the placement of the various adverts, and also to set their scheduling of appearance.

When these adverts are broadcast or published, the various media ad content 10 are viewed by the customer or consumer or viewer 2. The customer 2 makes purchase of the goods from the vendor 4 or manufacturer 6, both of whom accumulate the pertinent information regarding sales volumes and customer information into a vendor survey and sales info database 24.

In some cases, the media advert 10 may include a short text message or SMS or short code 20 associated with the ads which are likewise viewed by a customer 2. The customer 2 may respond to the short code message 20 and the response data is collected by the vendor 4, the manufacturer 6, or the advertising body 8, among others in a customer response database 22.

As shown in FIG. 1, the prior art provides only unstructured means by which the specific responses of each customer 2 are collected and utilized. This situation is depicted in FIG. 1 by the broken or dashed lines connections between the customer 2 and the customer response data 22 and the vendor and the vendor survey data 24. It is clear from FIG. 1 that the usage, for example, by the vendor 4 or advertising body 8 of the vendor survey data 24, and customer response data 22, to influence decision making regarding the advertising campaign is not direct. The feedback process in prior art is based upon incomplete information because these two sets of data are both collected in an informal fashion and are not centrally stored.

FIG. 2 illustrates a functional overview of the processing procedures that are typically involved in advertising campaign management using conventional methods and for which the participant interactions are shown in FIG. 1. As shown in FIG. 2, in the prior art, the creation of the creative content of the advertisement 11 is adjusted by iteration between the creative process 120 and the good or service provider process 110. The customer 2 interacts with the media adverts 10 in the media process 130 and the customer process 140.

Also shown in FIG. 2 is the new advertisement campaign process in which the good or service providers begins the conduction of an advertising campaign with the intent that the customer 2 responds to the media advert 10 by making a purchase. The campaign intent is summarized in a new campaign specifications 250 and a creative process is thereby initiated by capturing the specifications 250 in a prepare advert creative process 260 which after an iterative examination by the good or service provider undergoes an approval process 220 which either requires further work in a prepare advert creative process 260 or results in an approved creative advert 11.

A select schedule, channel, and duration process 270 is used to determine placement of the advert creative 11 on the alternative options for media channels. Placement location is based in part upon a pricing calculation for each of the alternative media channels. Once the advertising media content 10 is published or broadcast, the customer 2 views the content and may react with some action within the customer process 140.

If the customer 2 does happen to execute a make purchase process 280, the purchase volume information is collected as a matter of normal business by the vendor 4 and manufacturer 6 into the sales info database 24. At some regular interval such as weekly, monthly or yearly, these parties perform some analysis as to sales volume and thereby generate a sales report. These sales volume reports may then be used to compile sales projections and also to perform an assessment of the overall efficiency of the advertising campaign.

The advertising media content 10 may include for example a banner message on a television ad 16, or a magazine ad 12 may include embedded instructions which inform that the customer 2 can for example use their mobile phone to text a short message code 20 to some messaging address for more information. Alternatively, the ad media content 10 may encourage the customer 2 to direct their computer internet browser to view a particular internet web site. In these cases, the number of visits to the website or the number of messages received may be collected into the customer response data 22 or the vendor survey and sales info data 24.

The survey portion of the sales info database 24 may also consist in part of formally collected customer responses to specific questions such as obtained for example from product registration. The vendor 4 or manufacturer 6 may also informally obtain other types of information such as unsolicited consumer reactions and customer sentiments which may generally arrive in unstructured formats and be accumulated by these groups into the sales info database 24.

Volume of response to the embedded response requests may also be accumulated into the customer response database 22. The vendor 4 or advertising body 8 can based upon the customer response data 22 and the sales volume data 24 try to generate estimates of the efficiency of the advertising campaign in general and also for the relative efficiency of the ads on the various alternative media spots.

However, several key processes and information flows which may occur in prior art methods to conduct advertising campaigns are shown within FIGS. 1 and 2 as broken or dashed lines. These figures are meant to depict the incomplete nature of these lines of communication. Evaluation of advert creative 11 in prior art is ineffective and incomplete because capture therein of purchase information and especially customer feedback based on the advertising media 10 are not quantitative and formally collected. All prior art methods are therefore deficient in their ability to serve as a business platform to expedite management and optimization of advertising campaigns for not only vendors and advertising agencies but also customers. Conventional methods for management of off-line advertising may provide means to include in an advertisement the instructions to respond to a survey. They also do at times for example collect product registration information, but the information and responses are informally collected into what is depicted in FIGS. 1 and 2 as the customer response data 22.

Furthermore, prior art offers no potential sources of added benefit to the customer 2 beyond that which is evidenced by the advert media 10 which is immediately soliciting the customer response. Accordingly, it is commonplace that the level of customer response is minimally motivated. No information, much less incentive, exists for the customer 2 to seek out or pay more attention to one advert versus another except based on some direct and immediate value. Moreover, the usefulness of these response entries in the customer response data 22 is diminished because no formal means exist to compile or to search these data based on advanced criteria and background or even demographic information or personalized information regarding the individual customers.

Even in the instance of the customer responding to a specific advert with a short message, the overall advertising results are currently limited by their usefulness in overall management of the advertising campaign because of the inaccuracy and lack of speed in collection. This delay in acquisition occurs because of the indirect nature of the communication channels from customer 2 to response data 22. Therefore the contribution of any collected data to the creative process loop 120 and channel decision 240 and schedule decision 230 processes made with the good or service provider with the advertising body 8 is minimized.

None of the above mentioned methods or prior art are able to provide the quantitative assessment of advertisements in magazines, newspapers, and even on radio and television to capture customer response data in a short time frame and with either sufficient inherent information content or quantity of background information on accumulated customer info to support useful statistical analysis and much less efficiently compile this information to drive scheduling and channel decisions for real-time adjustment of the overall advertising campaign. Most importantly no existing methods provide immediate and continuous evaluation of the advertising campaign which allow adjustments to be made to optimize effectiveness in real-time.

Moreover, none of these prior methods have means to provide rewards to a customer in a way that helps defray the self perceived cost of imposition on them to participate in the advert evaluation process. Finally, no existing methods or systems provide means to intelligently provide additional incentives for participation and response to a user or customer based on knowledge of their previous habits and tastes.

SUMMARY OF THE SYSTEM

The present disclosure introduces a new system which makes it possible to perform in real-time the complete management of advertising campaigns running on all type of off-line media channels including newspapers, magazines, radio, television, and billboards. The system which expedites this method is termed for brevity the real-time off-line ad optimization (RTOO) system. The purpose of the system is to provide scalable software as service platform for advertisers, advertising agencies and publishers to monitor and measure the performance of any off-line advertisement and in any media and in real-time and/or with sufficient feedback to allow modification and adjustment of campaign adverts and parameters for more efficient performance.

It should be noted, that although referred to as "real-time" the system can be thought of in terms of real-time, near real-time, and asynchronous operation. An advantage of the system is the way in which users are encouraged to respond in greater numbers than in the prior art, and, regardless of how many respond, the ways in which the responses are used to aid in improving the performance of an advertising campaign.

The RTOO system and method provides assistance for decision making in running marketing and advertising campaigns and which, by virtue of being integrated with portable communication devices, can optimize the value of the advertising campaign. By integrating the usage of cell phones and other text paging devices, the RTOO system increases the efficiency of increasing the number of responses to solicitations embedded in advertising campaigns all the while minimizing the time spent to manually participate in doing this by the customer. The RTOO system enhances perceived benefits by the customer of their rewards gained for participating, and thereby preferentially increases the receptivity of customers towards advertisements which recognizably employ the RTOO branded embedded messages.

Accordingly, a system and method for dynamic off-line ad campaign management and optimization makes it possible to analyze the history of responses to a multitude of off-line advertisements, and based on the garnered customer habits, an individual customer's preferences for various activities and products is analyzed and then compared jointly with that of other customers. This process allows accurate classification of each customer. RTOO then provides ever improving statistical analysis of the likes and dislikes of customers as their history of participation with the system increases.

The history accumulated for each customer includes various time of response information. Determinations can accordingly be made of the best time and channel place to reach customer groups with any desired demographics criteria. Therefore, once the advertisement design process creates possible ads for a multitude of media types, and the vendor or manufacturer identifies the desired consumer group to be targeted, the RTOO system assists in the selection process which determines which ads to run, and to predict the most cost effective schedule for the ads on each media type. Moreover, as the ads are run, feedback begins to be accumulated immediately and adjustments are made based on closed-loop decision making in order to optimize the cost and effectiveness of the overall off-line ad campaign.

The method of ad campaign optimization further takes the captured feedback and organizes summaries of customer preferences in ranked order lists for display to the vendor. Then, based on the vendors selection of changes in ad schedule and coverage, the RTOO system displays the updated cost and graphs showing running and immediate tallies of campaign cost; and permits the vendor or advertiser to attach incentives or virtual coupons to their ad; and then performs the synchronization with remote servers of the media providers to permit accounting for incentive sharing. The disclosed method also includes means to keep track of overall incentives accruing to a customer using the system so that the customer can fully appreciate the advantages of their participation in terms of dollar, points, flyer miles, or coupon based savings among others. By virtue of the new ability to perform controlled experiments on with easily configurable incentive plans, the system provides the first real capability to truly assess the motivations behind viewer responses.

Accordingly, a method for advertising campaign management is provided which minimizes the burden of effort upon manufacturers, vendors, and even advertising agencies while maximizing the financial savings which can be realized by an advertiser running a campaign on multiple channels of off-line media. The method and system make it possible to essentially provide "software as service", which will be used both by small retail advertisers who might have an occasional short lived or modest ad campaign as well as large advertisers such as major car manufacturers who spends more than $1 billion dollars a year on advertising.

Another feature of system and method scalability are the ease of use and speed at which the user can launch the analytics to support an off-line advertising campaign. The software as service is almost entirely self serve. This means that it is intuitive to input, retrieve, and analyze the ad campaign information. Even billing functions are made entirely self serve as well. The method includes means for the user to make adjustments in real-time to emphasize advertisements that are working best and eliminate those that are underperforming. The tools for an advertising body to control a whole ad campaign are completely centralized and integrated.

By virtue of the extra incentives made available to customers for responding to ads which are associated with the advertisement distribution process of the present disclosure, the campaign will be made more effective than can be accomplished using prior art. This is true even if the same advert was viewed by the identical customer on the identical media because of the extra perceived value by the customer for paying extra attention to any advert associated with the RTOO system. When the RTOO system of this disclosure is in operation, the customer immediately recognizes that the advert is associated with the RTOO system through for example a displayed logo for the RTOO trade name branding. The customer, then realizing that there is value attractive to them is obtainable for watching and responding to the ad, will therefore pay extra attention and effort to that particular advertisement. The additional and moreover quantifiable customer audience response to an advert placed using the system of this disclosure, ensures the fast payback to the vendor for any RTOO system costs.

The RTOO system consists in one embodiment of: (1) a short code interface module, (2) a media channels interface module, (3) a vendor/merchant or advertising body user interface module, (4) a common short code administrations interface module, (5) a short code processing module, (6) a database query processing module, (7) a good or service provider or advertising body registration module, (8) an advertising campaign management module, (9) a real-time response analysis module, (10) a data center including a customer preference database, an advert media database, a media pricing database, a short codes usage database among others, and (11) a short code provisioning module.

In other features, updates of the media pricing database, the advert media database, or even short codes database can be performed by synchronization to the corresponding remote central system servers through for example an interne connection supported by the appropriate external interface module. In alternative embodiments, the analysis module includes reconfigurable graphics which allow display of the projected analysis results in user definable formats. In yet other embodiments, the media pricing that occurs in user directed fashion can be performed as a continuous background function or even permit automatic adjustment of the campaign to some pricing criteria such as minimizing the overall cost, or maximizing the effectiveness, or even performing a widespread experimental evaluation of various alternative ad campaign configurations.

The system provides traditional advertisement campaigns with means to include both use of cell phones and smart phones as well as means to embed a general call-to-action (CTA) within traditional ads which can solicit and foster responses from viewers thereby rendering the adverts accountable. The CTA within the adverts do not rely on or utilize phones or even text messaging but allow a wide variety of CTA's in operation.

The system also provides merchants the ability to contract with many desirable publishers and expand their marketing geography or the breadth of dissemination of their advertisements. The system can make it possible for small merchants to more widely disseminate their advertisements and offerings at no risk while limiting their upfront costs and yet while still preserving the accountability of their campaigns. The system allows advertisers, agencies, and publishers to expand the breadth of dissemination of substituent ad campaigns with a network of publishers that join together for the common purpose of adding strength to ad campaigns by supplying their own additional publication coverage while maintaining the inherent ability of the disclosed system and method to support assessment of advert effectiveness.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 15 shows a representative screen layout for entry of contact and other information for the creator of a new campaign as part of the campaign option of the graphical user interface for the RTOO system in accordance with an embodiment of the present invention.

FIG. 16 shows a representative screen layout for entry of an off-line ad as a member of a campaign as part of the off-line ad option of the graphical user interface for the RTOO system in accordance with an embodiment of the present invention.

FIG. 17 shows a representative screen layout for detailed review of the off-line ads which are members of a campaign as part of the off-line ad option of the graphical user interface for the RTOO system in accordance with an embodiment of the present invention.

FIG. 20 shows a representative screen layout for review of the off-line ads which are members of a campaign as part of the scheduling option of the graphical user interface for the RTOO system in accordance with an embodiment of the present invention.

FIG. 21 shows a representative screen layout for review of the calendar that an individual off-line ads is scheduled for running as part of the scheduling option of the graphical user interface for the RTOO system in accordance with an embodiment of the present invention.

FIG. 22 shows a representative screen layout for review of the off-line ads which are members of a campaign as part of the creative content option of the graphical user interface for the RTOO system in accordance with an embodiment of the present invention.

FIG. 24 shows a representative screen layout for entry of the text message and information messages and other pertinent information to be associated with a particular short code as available under the text marketing option of the graphical user interface for the RTOO system in accordance with an embodiment of the present invention.

DETAILED DESCRIPTION OF THE SYSTEM

Figure 1:
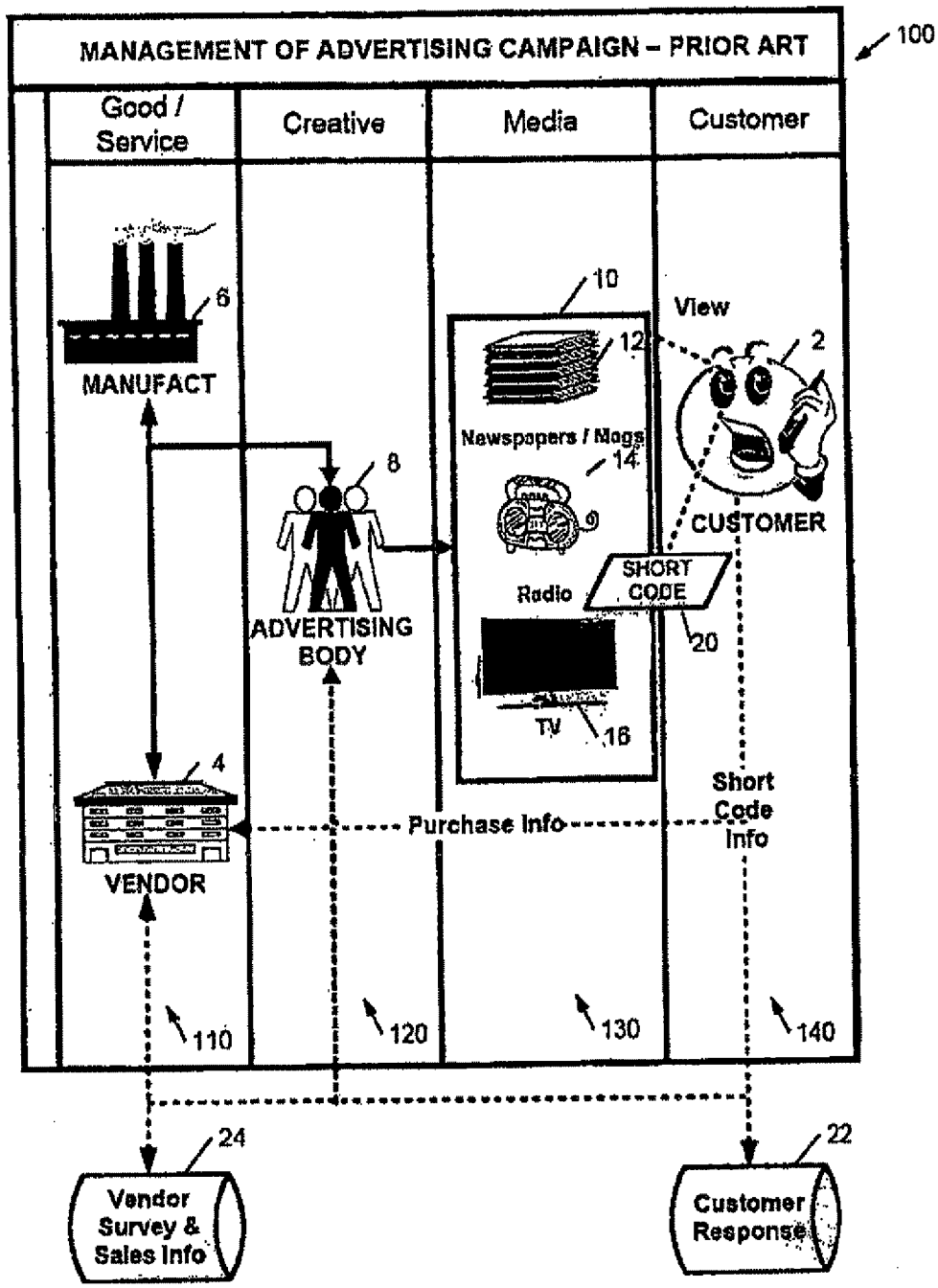
FIG. 1 shows a diagram for the business of advertising campaign management as conducted by advertising agencies and vendors according to the prior art.

The following description is merely exemplary in nature and is not intended to limit the present disclosure, application, or uses. It should be understood that throughout the drawings, corresponding reference numerals indicate like or corresponding parts and features.

The following discussion assumes the reader is familiar with promotional advertising concepts, advertising campaigns, off-line media advertising, personal computer hardware, portable wireless communications, short text messaging protocols, and computerized database technologies.

Without the deficiencies of prior art, the present invention can be advantageous to manufacturers who are making products which they need to promote, vendors who need to advertise their products or services, and any advertising body, either for a department within a large corporation, or a standalone advertising agency creating campaigns for a multitude of disparate clients companies. These organizations are highly motivated to achieve return on their financial investment in marketing and advertising. Their advertising spending therefore needs to be evaluated in terms of its impact on the customer base. The impact thus measured will then allow quantitative measurement of the performance of each advertisement and make it possible based on this information to maximize logistical and economic efficiencies of the overall campaign.

Various embodiments provide for a novel off-line advertising campaign management system that, through its new and unique combination of software and system interfaces, increases the ability of a good or service provider to select optimal media channels for their product or service. At the same time, users can geographically locate the regions and even schedule the times in which to utilize each of these media channels in order to achieve significant improvements in the overall and measurable effectiveness of their advertising campaign. These capabilities enable the more widespread and encourage frequent employ by advertisers of the present invention and therefore there is created a positive feedback cycle. That is, the real-time off-line ad campaign optimization system increases the speed for evaluating effectiveness of off-line advertisements, the decreased time needed for evaluation results in improved accuracy of the evaluation. This incorporation of the survey within the advertisement itself directly results in reduced cost for performing the survey or evaluation. This embedding of the survey results in direct dollar savings for the advertiser in the overall cost of the campaign. This decreased cost and increased accuracy will in turn result in widespread use of the system and methods which itself in turn then engenders enhanced customer participation and response.

Further factors foster improved interest and concentration by these customers and viewers during their actual viewing of advertising placed using the system of the present disclosure. Viewers will recognize that ads using the disclosed methods will provide them more ease of efforts to respond using the embedded advertisement evaluation process and enhanced benefits and ability to gain additional promotions for participation in the evaluation process. The viewers will therefore preferentially support the employ of the disclosed system and method. Therefore the real-time off-line ad campaign optimization system engenders a cycle of decreased advertising cost, increase speed to evaluate ads, increased accuracy of evaluation, decreased survey cost, and increased ad effectiveness.

As can be appreciated, the method and system for the real-time management and optimization of off-line advertisement campaigns are applicable to various advertising campaign managers, including, but not limited to, manufacturers, goods and service providers, advertising departments, and advertising agencies. Essentially all kinds of merchants can make use of the invention to promote their particular business. Although the methods and systems are applicable to various media channels and viewer end response can be made on various hardware apparatuses including cell phones, wireless portable digital assistant devices, text paging devices, and even through dedicated kiosks, for ease of the discussion, the remainder of the disclosure is presented in the context of mobile phone systems.

The present disclosure describes various embodiments of a system and method for improved advertising using embedded surveys and ad monitoring, analytical analysis of ad effectiveness, all followed by improved performance feedback and especially centralized means to manage and control and to optimize the advertising campaign. In all its various embodiments an RTOO system 300 can perform control of advertisement placement and scheduling for maximum efficiency of a campaign while minimizing required efforts from a campaign manager. The RTOO system 300 can be implemented within a single computer or be distributed over a number of devices.

Various software modules, data structures, and processes for performing enhanced campaign management and optimization are encapsulated within the RTOO system 300. In one embodiment, the following steps are used to initiate a campaign. A user (i.e., publisher, agency, or advertiser) will (1) define themselves, (2) document the off-line advertisement (3) set type of text marketing campaign that is being measured then (4) test and (5) launch the ad campaign.

Figure 25:
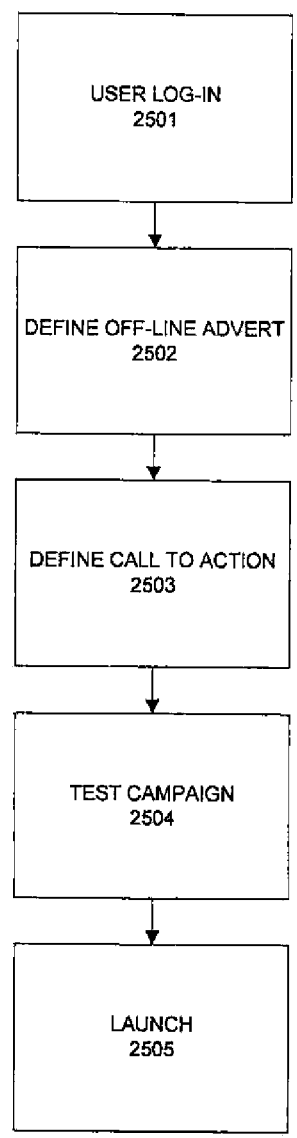
FIG. 25 is a flow diagram illustrating initial operation of the system.

FIG. 25 is a flow diagram illustrating the initial operation of the system. At step 2501, the user logs in to the system. If the user is not already a participant or authorized user of the system, the user will set up a presence, identifying themselves to the system and providing any required identifying information. At step 2502, the use will define the off-line advertisement to be used as part of the campaign. In one embodiment, the user may define a number of adverts where there is at least one advert for each type of off-line format for which the user contemplates placing the advert. In one embodiment, the user may set up more than one advert in each format of off-line media, such as multiple print ads, multiple TV spots, multiple radio spots, and the like.

At step 2503, the user defines the call to action for the campaign. This includes the incentive (i.e, promotion, discount, membership, and the like) to entice a response from a customer exposed to the ad, as well as the mechanism (e.g. short code, promo code, and the like) by which the customer will respond.

At step 2504, the user tests the campaign, ensuring that the ad is as desired and that the call to action performs as expected. At step 2505, the user launches the campaign.

An exemplary RTOO system may include: (1) a short code interface module, (2) a media channels interface module, (3) a vendor/merchant or advertising body user interface module, (4) a common short code administrations interface module, (5) a short code processing module, (6) a database query processing module, (7) a good or service provider or advertising body registration module, (8) an advertising campaign management module, (9) a real-time response analysis module, (10) a data center including a customer preference database, an advert media database, a media pricing database, a short codes usage database among others, and (11) a short code provisioning module.

It is appreciated that the modules and data structures shown may be combined and/or further partitioned to similarly perform off-line ad campaign management. Various embodiments of campaign management and optimization methods and systems include alternative implementations and combinations of the above described elements as will be described in more detail below.

Figure 3:
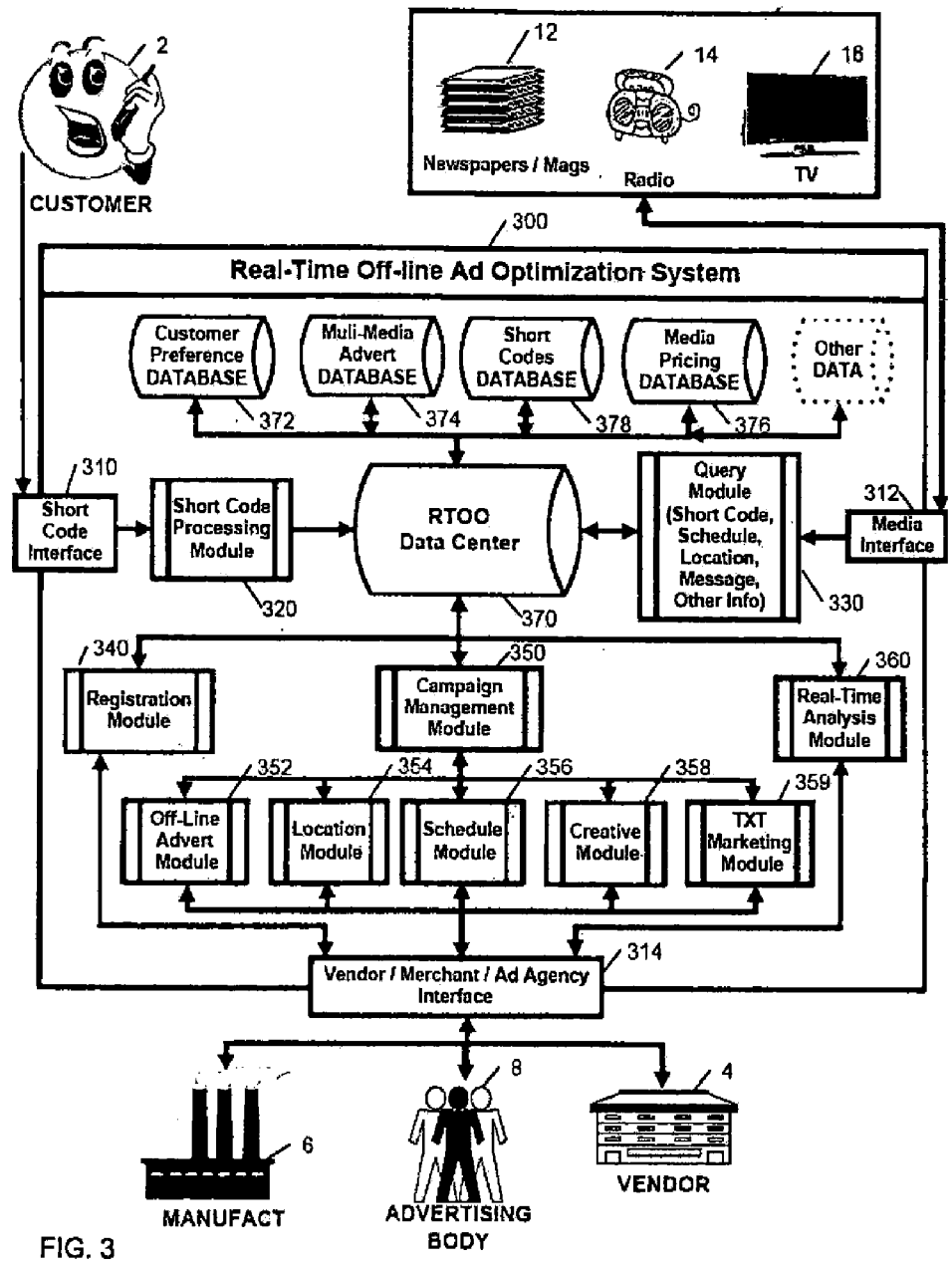
FIG. 3 is a block diagram illustrating a system to conduct real-time management and optimization of off-line advertising campaigns according to various aspects of the present disclosure.

For the sake of simplicity of description, an exemplary RTOO system 300 is shown in FIG. 3. The arrows in FIG. 3 show the flow of communications between various RTOO system modules. A vendor/merchant or advertising body user interface module 314 serves for configuration, and control of operation and display of the RTOO system 300. The advertising body user interface module 314 is used to provide input to a good or service provider or an advertising body registration module 340, an advertising campaign management module 350, and a real-time response analysis module 360 (it should be noted that the response analysis module may also perform in near-real time or in some other asynchronous manner where responses are received after ads are run and the system is able to associate responses to particular off-line channels as well as to particular time periods of ad presentation). These modules operate and interact with the central registry of information contained within a real-time off-line ad optimization data center 370. The RTOO data center 370 comprises a customer preference database 372, an advert media database 374, a media pricing database 376, and a short codes usage database 378, among other databases.

The most directly obtained data in the customer preference database 372 is created in part by interactive collection from a customer that registers as a member of the RTOO advertisement response club or organization. Registration for RTOO related club membership may be conducted for example by the customer visiting an RTOO related website and filling out survey information using online forms. The remainder of information in the customer preference database 372 is accumulated over time using the RTOO system 300. This data is formed by the cumulative history of short code responses to advertisements, which participate in the real-time off-line ad campaign optimization method, by a particular individual customer 2.

For example a bank might run an advertisement for discount mortgages and place a call-to-action text message that offers a free credit check for all those that apply for a mortgage loan. In this case the bank might create a text marketing message that says, "Send the key word bank to the short code telephone number 5225 and get a free credit check with every loan application." In this case, "bank" is the keyword, "5225" is the short code, and "get a free credit check with every loan application" is the message.

The present disclosure describes various embodiments of a method for real-time managing off-line advertisement campaigns that comprise means for multiple different types of text message based marketing or call-to-action campaigns. The call-to-action incentives include among others: (1) advertisements, (2) promotions, (3) coupons, (4) discounts, (5) games, (6) voting, (7) sales, and (8) information.

The system of the present disclosure makes it convenient for the advertiser to offer any of these incentives to the viewer in order to increase the likelihood of their conversion. Conversion is the process by which a viewer purchases or subscribes to an advertiser's product or service. The word conversion describes how an advertiser might first encounter a viewer as a sales lead and then the lead would "convert" to becoming a customer by buying a product. Another example might be a viewer who converts to joining an airline frequent flyer program, even though they are not purchasing a product. On-line advertising actively measures the number of conversions by placing pixel recognition software or html and JAVA code on the transaction page of a web site.

The present disclosure makes it possible to measure conversions in off-line settings for its publishing, advertiser or agency clients by providing a hosted web page where viewers of an ad can post the discount coupon or promotion number they received in their text message. Viewers will then receive a discount or product as advertised. The conversion page associated with the disclosed system will require three pieces of information in order to track the conversion: (1) the viewers telephone number, (2) the coupon or discount code that the viewer received, and (3) the viewer's zip code.

Creative advertisement or creative is a term used to describe the advertisement being used to promote or sell a product or service. The creative or advert media database 374 contains actual viewable or listenable content. The media database 374 content includes digital copies of the print ads which will be published in a magazine, newspaper, or even roadside billboard displays. It also includes sound files in a digital format such as way, or mp3 files for play on radio commercials. Multi-media ads created for example for broadcast television, cable TV, and viewing in theaters before movies, can be stored in a number of formats in the digital database including among others, diva, avi, mpeg4, mpg, and wmv type files. The RTOO system 300 uses the files stored in the media database to allow quick creative review by the decision makers while using the analytical information to adjust the scheduling and geographical distribution of ads. The easy and organized access to review capability while simultaneously reviewing the performance data will allow creative design and also management teams, when collaborating on overall advertising strategies or adjusting demographic targets, to better predict the way to design an ad or position it in the marketplace to get the highest performance.

In the case when an advertiser broadcasts an unsolicited wireless message to a subscriber base, the advertiser must seek permission from the telecom carrier such as Verizon, T-Mobile, Cingular and Sprint, for the content. Worse yet, in almost all cases, the carrier charges hefty fees for broadcasting on their network. As a general rule, advertisers find this disruptive, expensive and a lengthy administrative burden on their advertisement. It is important to note, for the system of the present disclosure, that because viewers opt in to the off-line advertisements supported without receiving an unsolicited message, the telecom carriers in the United States are precluded from participating in the advertisers campaign. This situation greatly increases the value of the RTOO system to the user both by decreasing direct broadcast fees and also indirect labor costs.

Media buy refers to the buying of advertising space from a company operating media properties such as TV, radio, newspapers, magazines and billboards or outdoor kiosks. The cost of a media buy varies depending on (1) the specific media property on which the buyer wants to advertise, (2) the size of the advertising campaign, (3) the specific times at which the advertisements are to be displayed, and (4) other specific features of the advertising campaign. The media pricing database 376 is built by entering pricing information either manually or automatically collected from the various media channels. Each media channel can have different means for calculating their pricing of an advertisement. Magazines for example run on a monthly basis and charge prices depending on ad size and position. Television commercial prices depend on length, time of day, and are related to the popularity of the show or program during which the spot is aired. The pricing database 376 contains all rules and formulas necessary to make complete price calculations for each media channel, and upon campaign configuration by the operator or user, is used to calculate the total cost for each particular ad included in the campaign along with overall campaign cost.

A Common Short Code (CSC) is a number assigned and administered by the Common Short Code Administrator (CSCA) (www.usshortcodes.com) for the purpose of enabling marketers to have one number to send SMS text messages. Short codes can be shared by multiple marketing campaigns or they assigned to specific campaigns. The short codes usage database 378 contains a complete and current history of which short codes are assigned to each vendor and advertisement. This provisioning information is used to prevent duplication of assignment and also permit accurate analysis of the viewer or customer responses. The interpretation of the keywords and text messages sent by the customer 2 in response to a short code 20 is made in the context of each ad campaign. It is necessary for the RTOO system 300 to check a request for a short code against the codes usage database 378 before provisioning of the short code for a new advertisement to be run and also to prevent misinterpretation and misassignment of a viewer response to the wrong advertisement.

A media interface module 312 makes communication possible with all the various media channels in order to automatically perform various functions including among others gathering the pricing information from the disparate channels. In a preferred embodiment, update of pricing information is an automated process whereby media channels send any changes in pricing as they are made directly to the media interface 312 to the RTOO system 300.

A database query processing module 330 is shown in FIG. 3 as gathering data from the media channels for storage in the real-time off-line ad optimization data center 370. The query processing module 330 also performs all queries that are necessary to create an ad campaign or to assist in the response monitoring and analysis. A short code interface module 310 provides the ability to capture the customer responses including among others, text messages and keywords sent in response to a particular short code in an advertisement. A short code processing module 320 takes the captured text messages and keywords and enters them into the appropriate fields in the customer preference database 372 and other databases contained in the RTOO data center 370 that are necessary to keep track of the volume, timing, and location of each customer response and permit the accurate combined analysis of all the received customer responses.

A campaign management module 350 comprises a number of submodules including an off-line advert module 352, a location module 354, a schedule module 356 a creative module 358, and a text marketing module 359 among others. The off-line advert module 352 provides the ability to setup a campaign as well as configure the components ads. The location module 354 provides the ability to setup the geographic distribution for a particular ad. The schedule module 356 provides the ability to setup the time for broadcast for a particular ad be it on dependent on time of day, day of week, or alternatively before, during or after a specific television or radio show. The creative module 358 provides the ability to setup the digital media file for a particular ad. The text marketing module 359 provides the ability to setup the text message for example to be overlaid on a print ad or shown as a banner of a television commercial.

As shown in FIG. 3, the RTOO system 300 contains all the interfaces, modules, databases, and data analysis tools to configure an ad campaign, price its component and overall costs, provision short code usage and associated keywords, collect customer responses to the ads, analyze these customer responses and use the response information in performing analyses which assist in the optimization of the ad campaign effectiveness. In various embodiments, the RTOO system can not only assist but even automate the conduction and coordination of the trial marketing experiments needed to determine effectiveness of each advertisement making up an advertising campaign. The system can then optimize the execution of the campaign based on predetermined criteria and objectives such as cost or importance of response of particular customer demographic groups.

Figure 4:
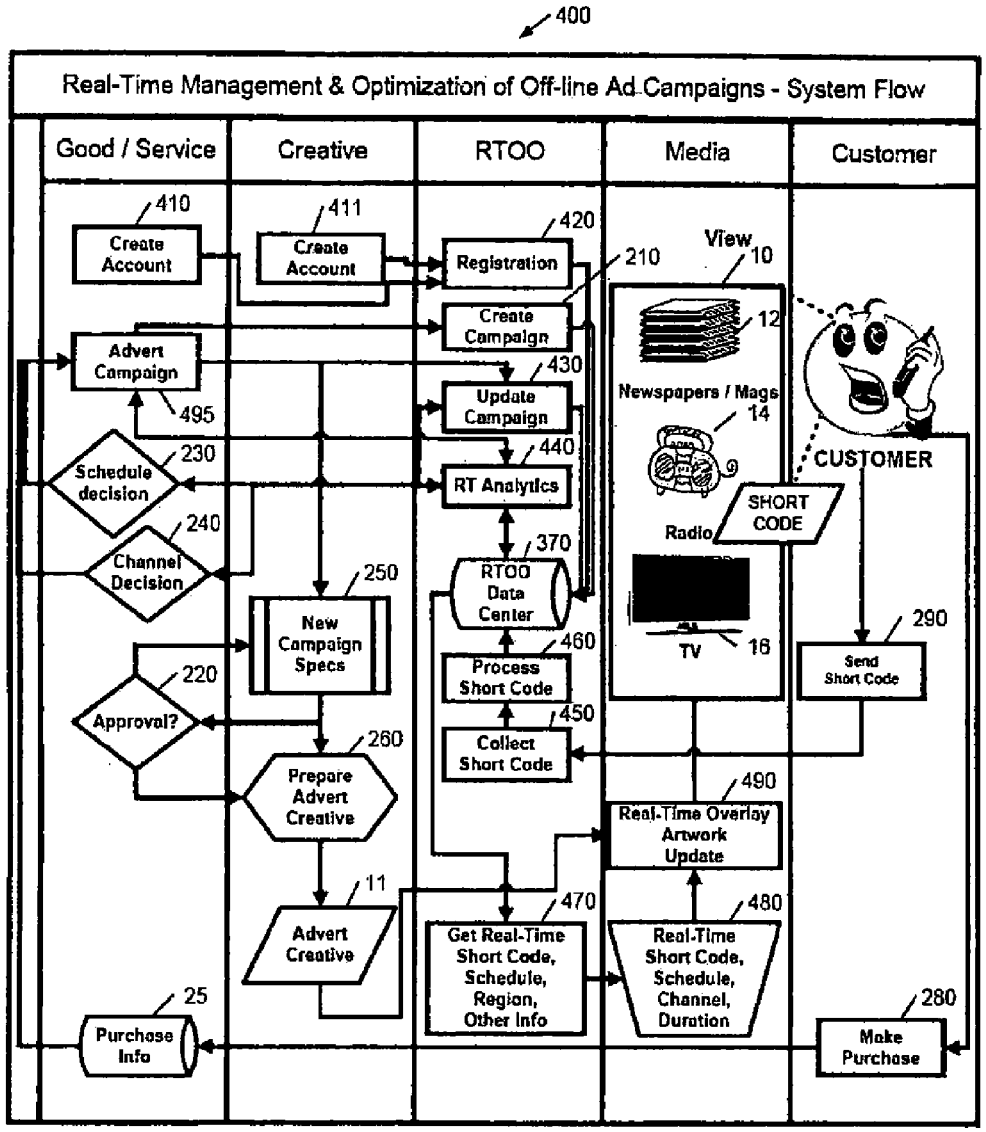
FIG. 4 is a flowchart illustrating operation of the RTOO system for real-time campaign management, control and optimization according to various aspects of the present disclosure.

FIG. 4 is a flowchart illustrating a method of advertising campaign management using the exemplary RTOO system 300 as shown in FIG. 3. FIG. 4 illustrates the improved process for campaign management using the RTOO system as contrasted with the prior art methods shown in FIG. 2. As can be seen in FIG. 4, another new column is inserted into the process of ad campaign management as contrasted to the process shown in FIG. 2. This new column signifies the introduction and usage of the real-time off-line ad optimization system between the good and service provider and creative bodies on the left side of FIG. 4 from the media channels and the customer on the right side of the figure. This new column and incorporated series of processes within are those which are conducted in a semi or even fully automated fashion by the exemplary RTOO system.

In this embodiment, the capture of the viewer response data is more accurate, numerous, and immediate so that the viewer sentiment can be analyzed in real-time together with information about the campaign itself and with captured information regarding the past history and demographics of the responding customers. This real-time analysis allows the RTOO system to create reports which can improve advertisement performance and perform campaign optimization in a continuous loop fashion.

Figure 2:
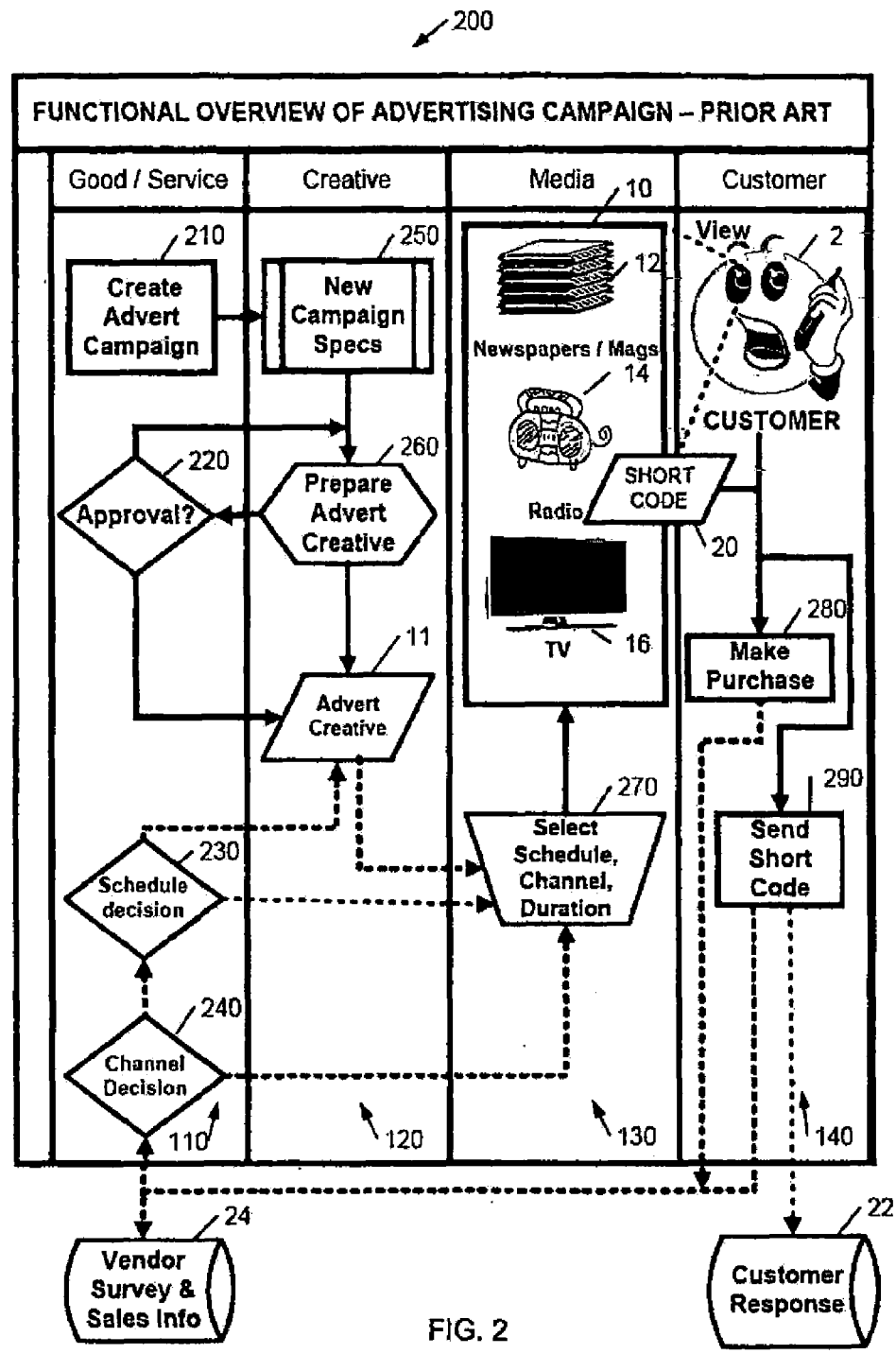
FIG. 2 shows a functional overview of the processing procedures that are typically involved in campaign management according to the prior art.

Therefore, the broken and dashed lines in FIGS. 1 and 2 which signify the incomplete flow of information and communication between campaign management processes in prior art methodologies are replaced by solid lines in FIG. 4. In the present disclosure, the real-time capture of short code response data and assisted entry into the RTOO system databases facilitates the immediate and automated analysis which can then be used to command, coordinate, and optimize the entire ad campaign. The incomplete flows and processes of FIG. 1 and FIG. 2 thereby become reliable processes which are automated by the system of this disclosure, and the representative flow lines signify this formal process by being drawn as solid.

As shown in FIG. 4, by employing the RTOO system, either the good or service providers can use the RTOO software program to create an account 410 or the creative body can execute a create account process 411. Following a registration process 420 the registered party can begin to create a new advertising campaign 210. Also as shown in FIG. 4, as the customer 2 responds to the advertisements by making a purchase 280 or sending a short code text message 290, the disclosed system collects the purchase data 25 but also most importantly collects response data in a collect short codes process 450. The RTOO system then performs the operations necessary to, process short code information 460 for storage of this captured information in the RTOO data center 370. When the customer makes a purchase, the purchase information database 25 is updated and the good or service provider, if they want this information available to improve the campaign analysis, communicates this information to the RTOO data center. Communication can be made by some means including either manually, manually on a regular basis, or can even utilize means to communicate the information automatically.

In any event, the RTOO data center 370 contains updated customer response data and an update campaign process 430 can be executed by the good or service provider, the creative body, or the system operator to perform appropriate queries on the response data and other accumulated data in the RTOO data center 370. Then this data is used to execute real-time analytics which can be in turn used to generate graphics assessing the performance of the various ads or to make automatic determinations of the ad performances and even make recommendations as to how to improve customer response based on ad location, scheduling, and media types among others. Given the accumulated base of knowledge about individual responders and their historical responses to various other advertising campaigns, the RTOO analytics processes 440 can make far reaching inferences as to what characteristics make up the ideal audience or customer for the advertised products and can also determine which are the most effective channels, days of the week, and times to reach each subgroup of customer being targeted.

The RTOO system then recalculates the overall cost of the campaign and the system operator can make the expedient changes in the campaign and immediately see the impact on total campaign economics by using the built-in media pricing information. In preferred embodiments pricing and changer thereto are obtained directly and even automatically from the various media channels.

Figure 5:
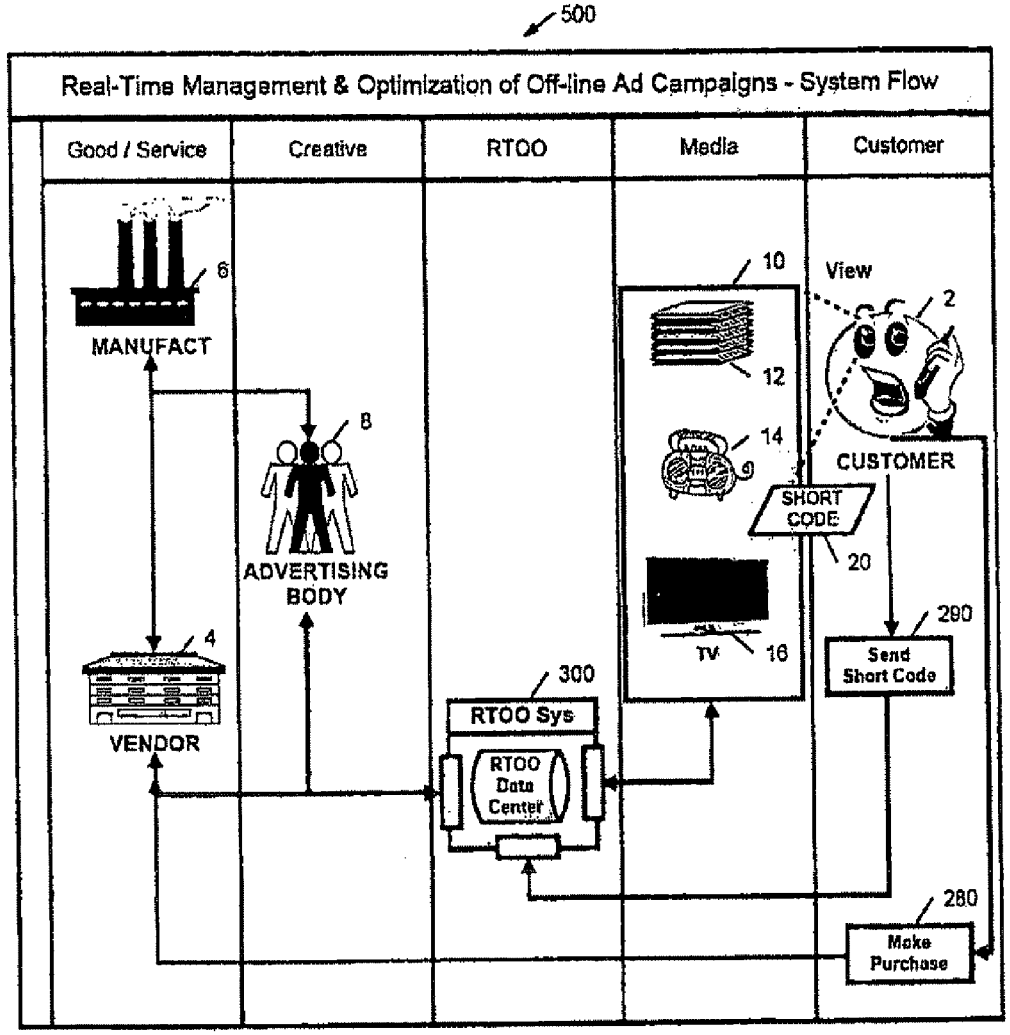
FIG. 5 show a diagram for the business of advertising campaign management when advertising agencies and vendors use a system to conduct real-time management and optimization of off-line advertising campaigns according to various aspects of the present disclosure.
Figure 6A:
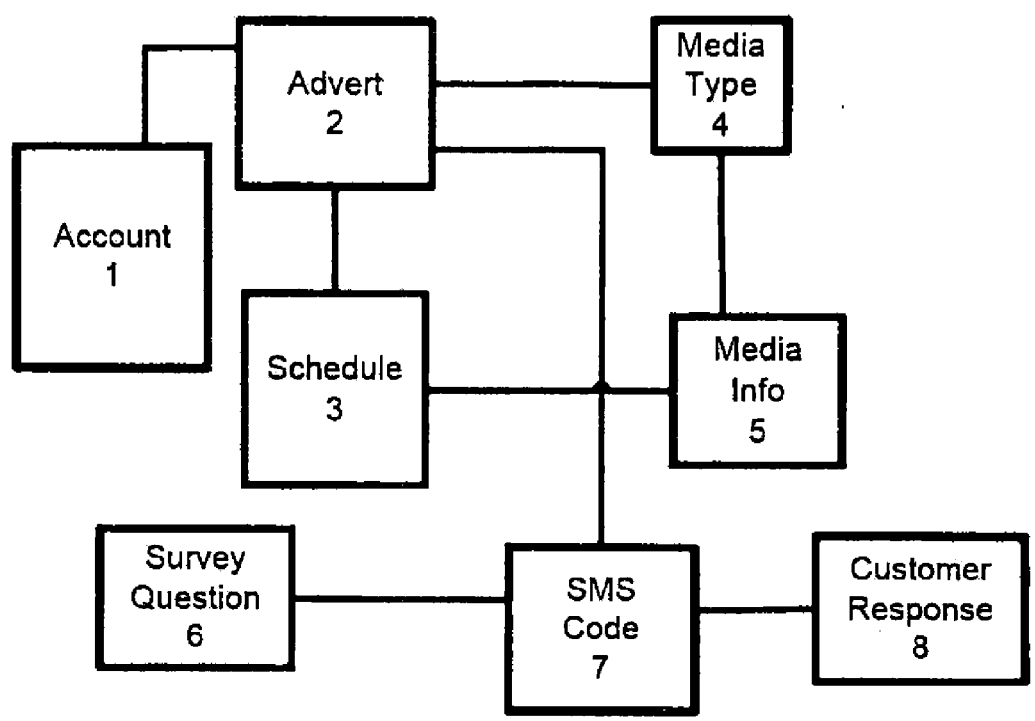
FIG. 6A-6H show an exemplary database schema for some of the component databases that comprise the data center for a system to conduct real-time management and optimization of off-line advertising campaigns.
Figure 6B:
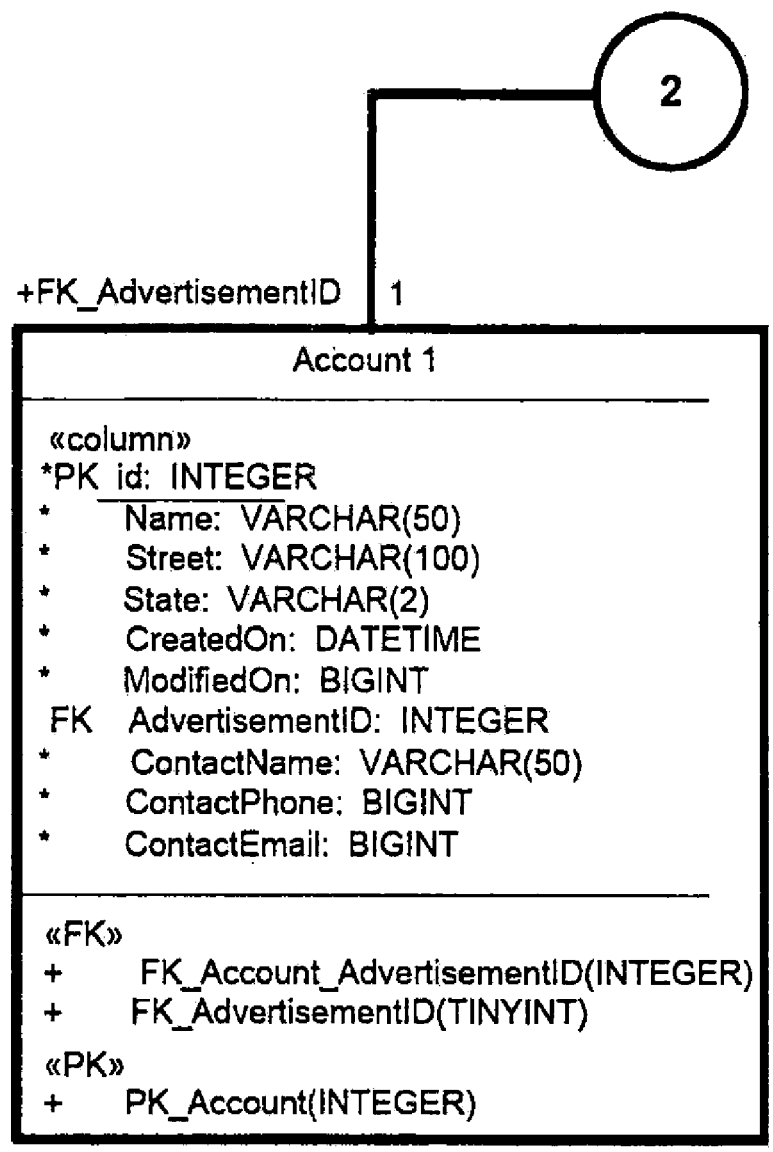
Figure 6C:
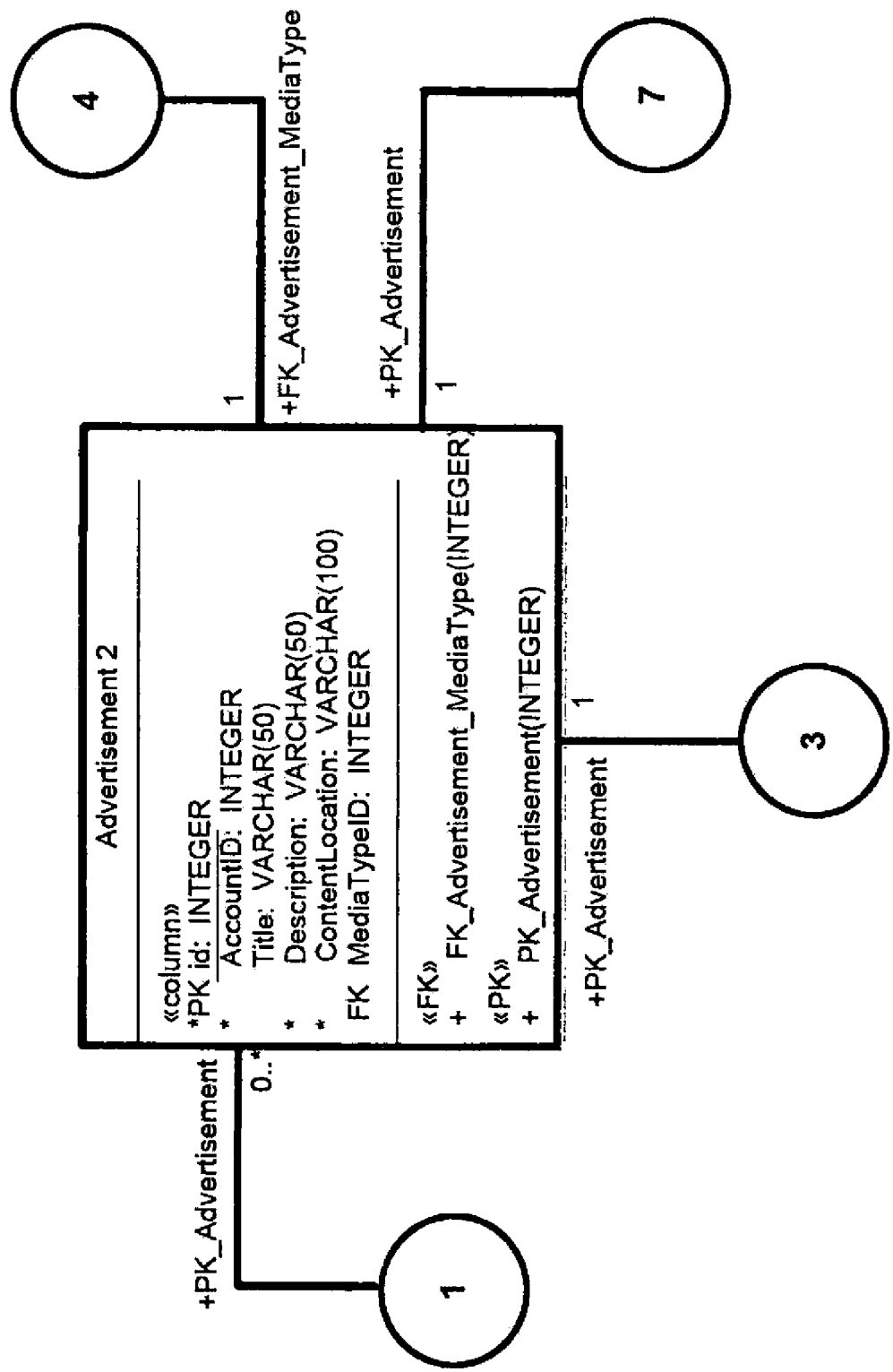
Figure 6D:
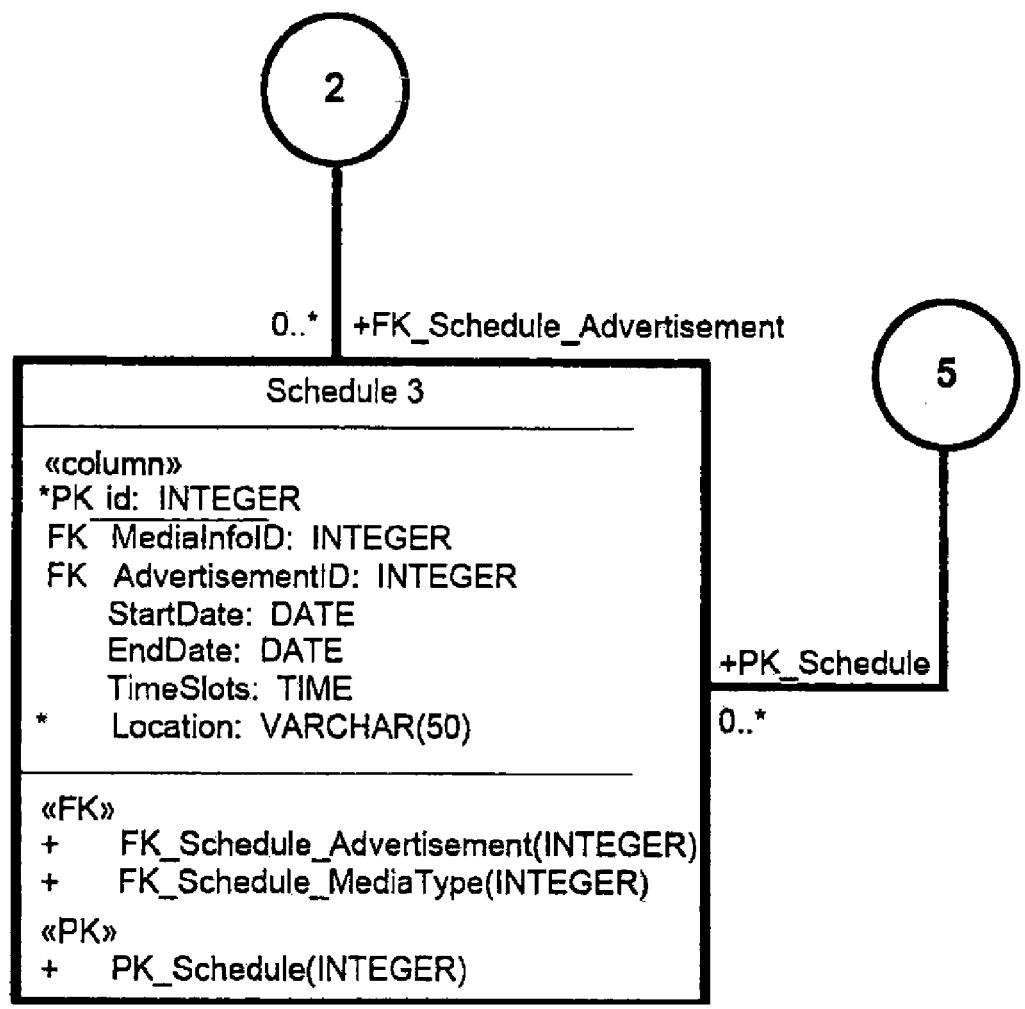
Figure 6E:
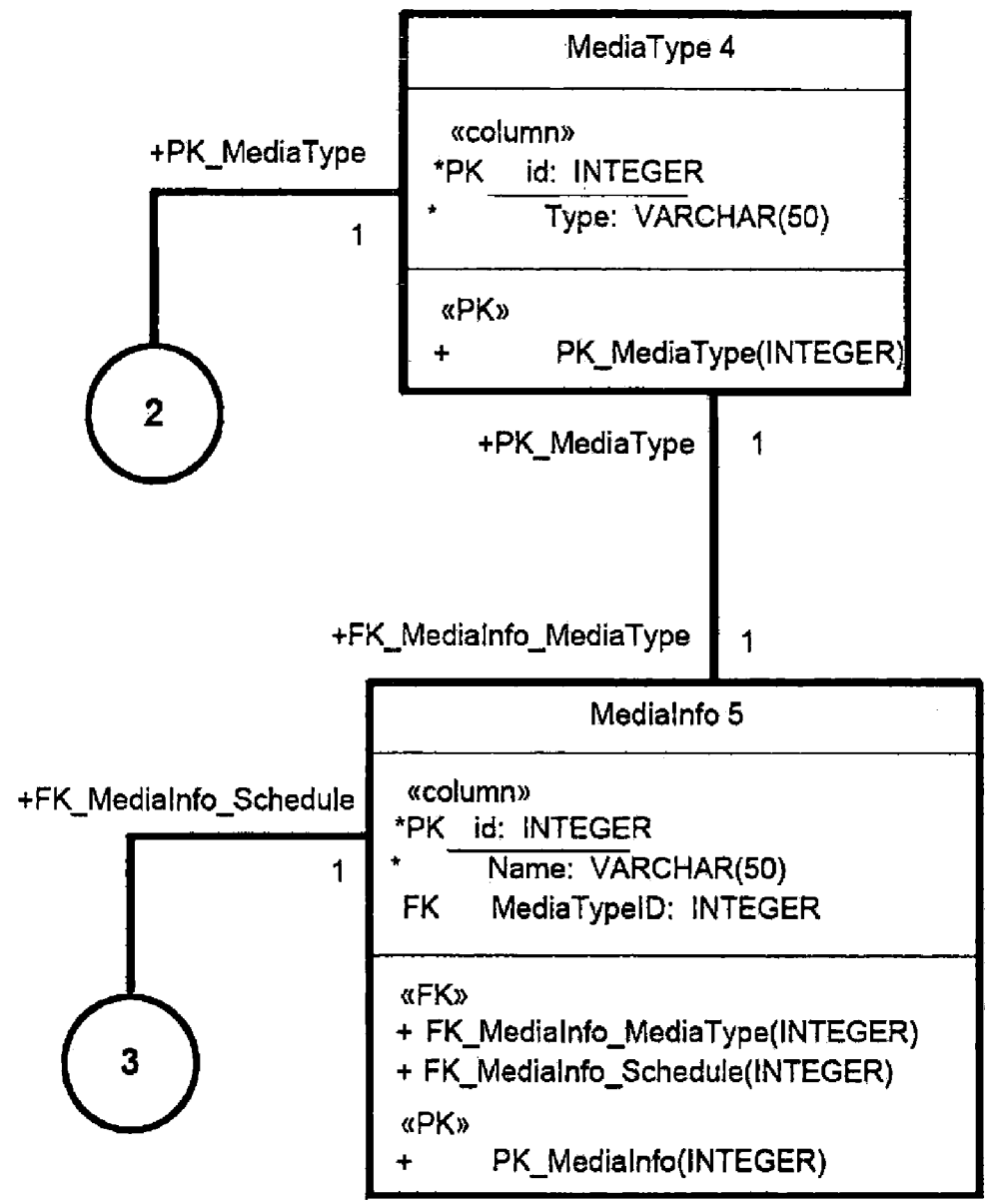
Figure 6F:
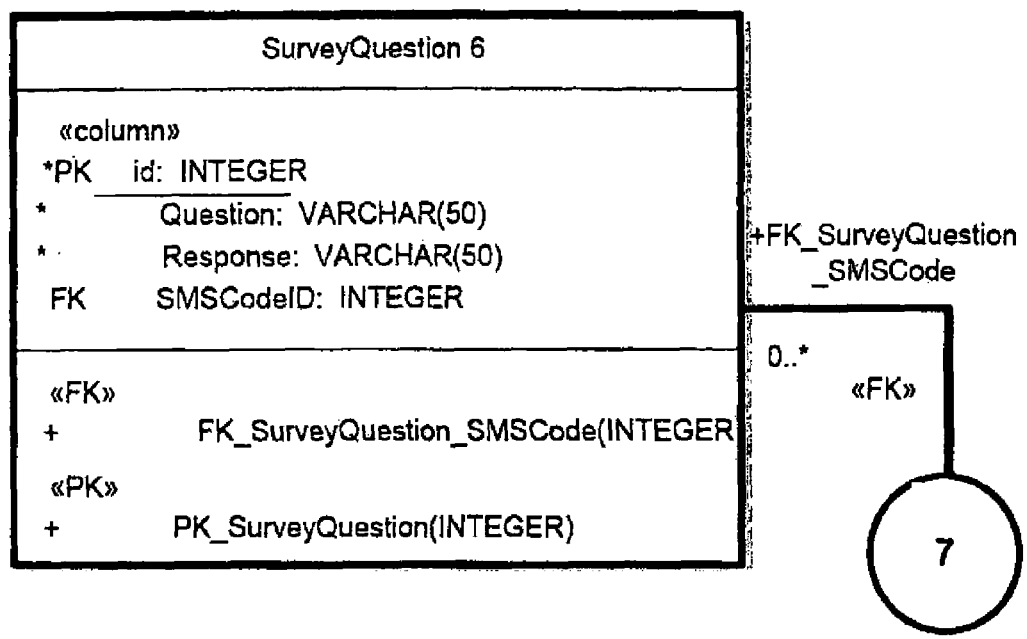
Figure 6G:
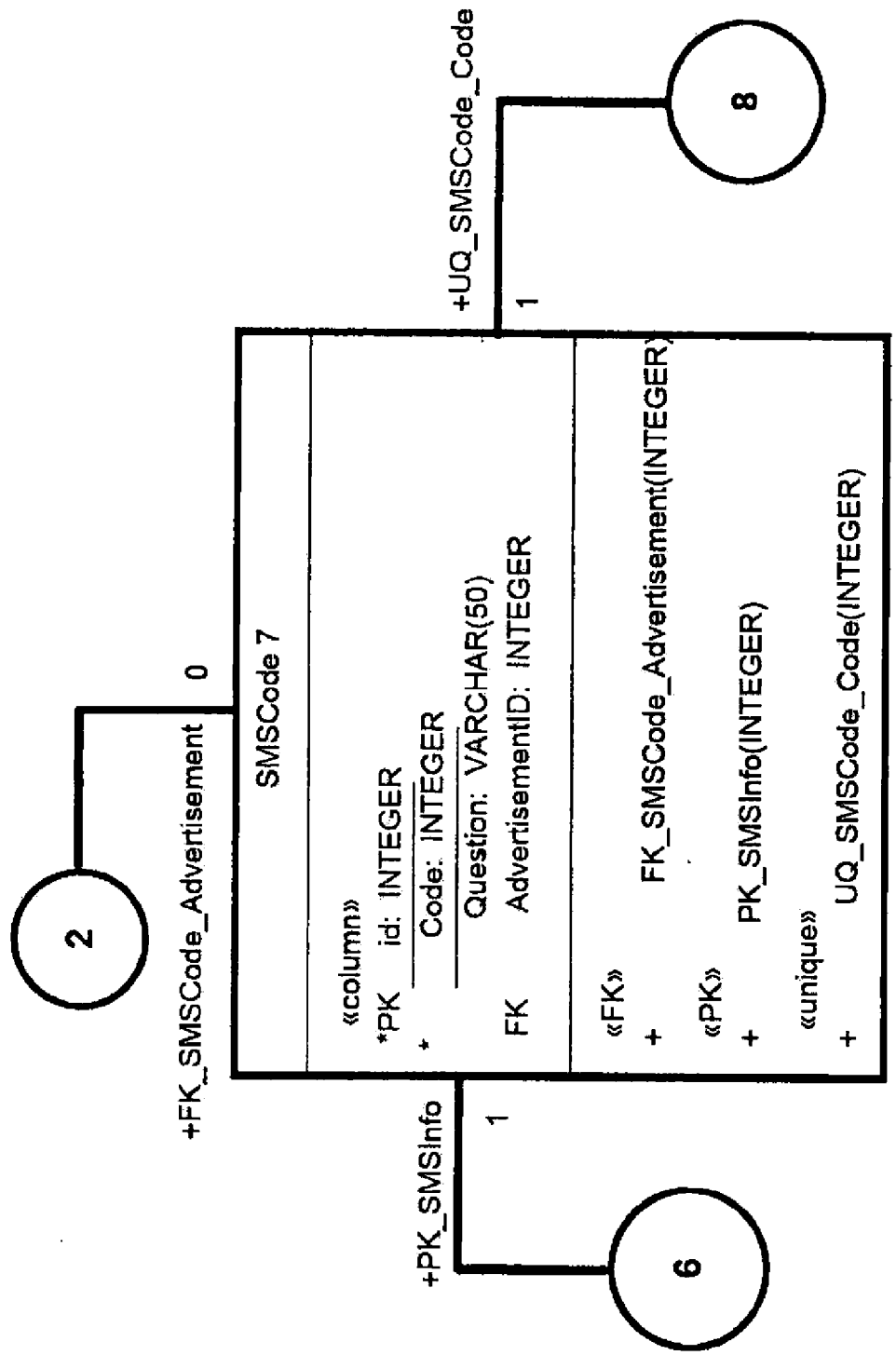
Figure 6H:
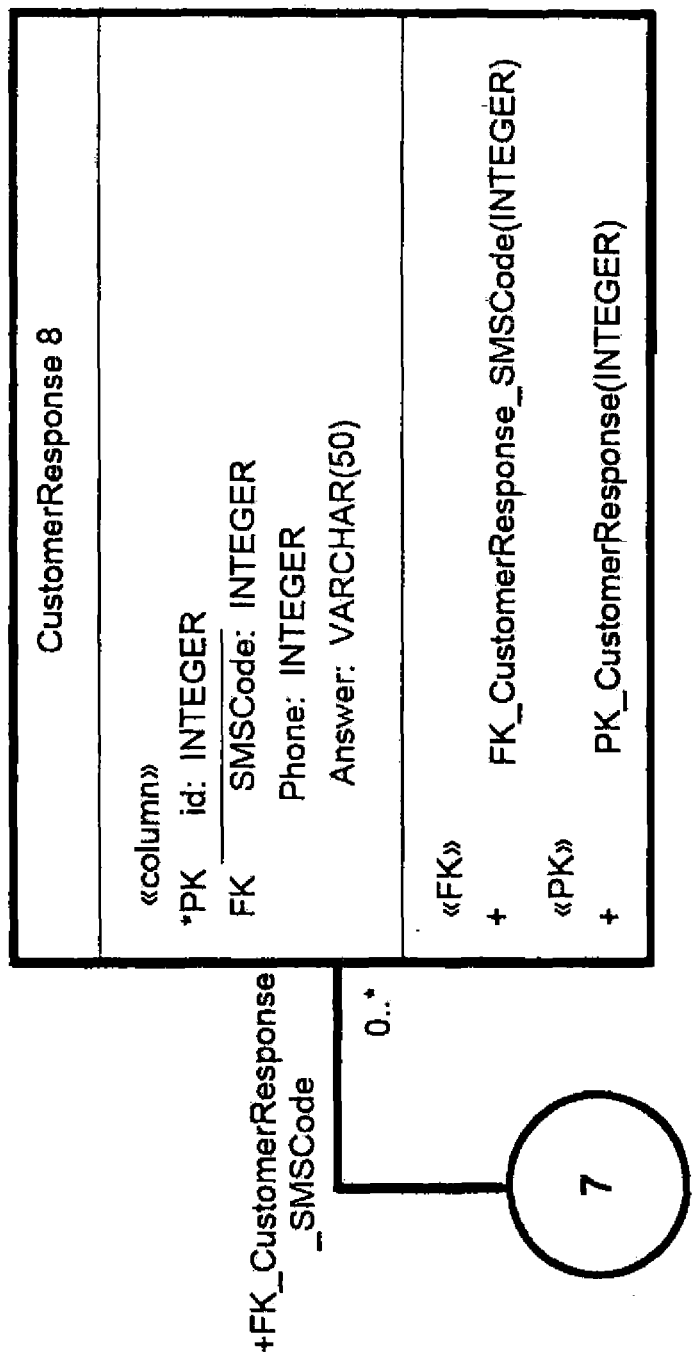

FIG. 5 is a general overview which diagrams the usage of an exemplary system which performs real-time off-line ad campaign management. As shown in FIG. 3, an exemplary RTOO system comprises software which compiles databases with complete ad placement and scheduling information, media pricing, sales data, and both current and historical customer responses. The exemplary system also incorporates a data analytics engine which permits the system user to perform "what if" scenarios or real-time analysis on existing data. The manufacturer 6, vendor 4 or advertising body 8 can each then use the RTOO system to generate data analyses to be used as the objective basis for making changes or adjustments to the advertisement campaign media channels, geographic placement, and broadcast or publishing scheduling. Importantly, unlike any prior art means for assessing off-line ad effectiveness, the analysis of the present disclosure can be conducted while responses are continuously accumulated during the current campaign.

FIG. 3 and FIG. 5 depict that in a preferred embodiment this central system data store includes purchase and viewer response data and media pricing information. Specifically shown in FIG. 5 is the fact that with the centralization of the ad campaign related data, the user interface, and the analysis capabilities, the disclosed system thereby closes the feedback loops between viewer responses and purchases and the management system databases. The full spectrum of functionality necessary to manage an ad campaign is completely centralized in the disclosed system. Therefore, use of the methods and system of the present disclosure supports optimization in real-time of the overall ad campaign effectiveness.

FIGS. 6A-6H show an exemplary database schema for some of the component databases that comprise the RTOO data center 370 according to various aspects of the present disclosure. This schema is merely representative and the complex relations and interactions between the various database tables must capture the many to one and one to many or one to one relations between the various database elements.

Figure 7:
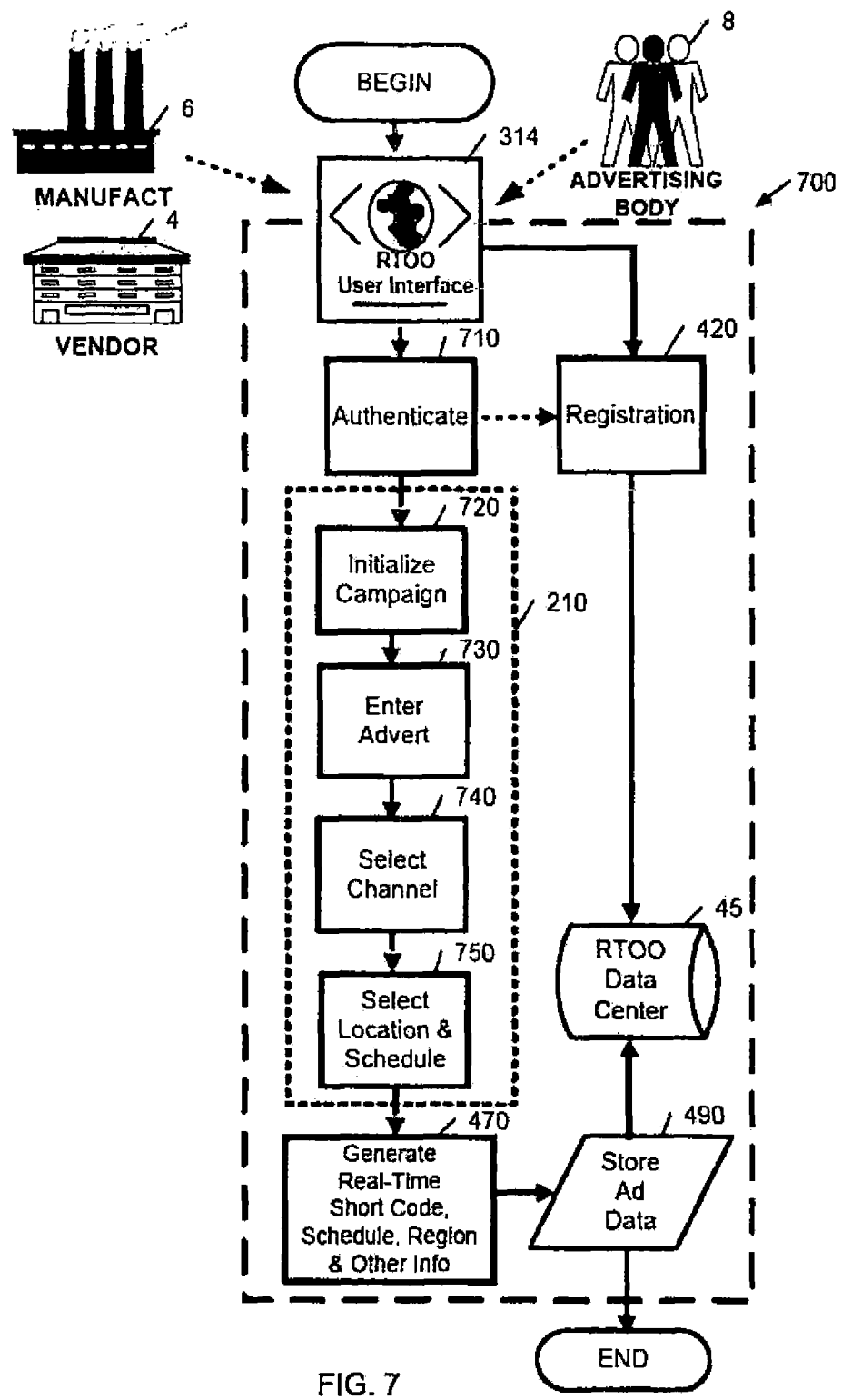
FIG. 7 is a process flow diagram illustrating a method for setup of an advertising campaign as performed within the real-time off-line ad optimization system.

FIG. 4 shows the complete functionality and flow of the RTOO system for all aspects of campaign management. However, FIG. 7 is a process flow diagram strictly for illustrating a method of registration and setup of an advertising campaign as performed using the software modules within the RTOO system 300. The creator defines who he/she is and identifies the text marketing campaign. The creator is a content publisher, advertising agency or advertiser. A publisher is any company that creates content and produces it in newsprint, or billboards or a broadcast medium such as TV or radio. Examples of publishers are the New York Times, CBS TV or Vista View Billboards. An advertising agency is a company that represents an advertiser client for the specific purpose of delivering a message that will either increase brand awareness or conversions. Examples of large agencies are JWT, and Saatchi & Saatchi. An advertiser or client is the ultimate purchaser of the media and is the seller of a product or service.

A creator or manufacturer, vendor, or advertising body employs the user interface software to first register and create an account within the real-time off-line ad campaign optimization system. This will involve some form of secure identification that can be used for future login verification. Once a user is registered within the system, in the future, they can login and upon authentication of their identity through an authentication process 710 can create an advertising campaign to increase awareness or sales of a product or service.

The user then performs a create campaign process 210 as shown in FIG. 4 which consists of a number of sub-processes as detailed in FIG. 7. The user performs an initialize campaign process 720. This allows the user to name the off-line advertising campaign that is delivering the text message to viewers and enter the various adverts which will constitute the campaign by performing the necessary number of enter advert processes 730. This is the process that assists the user with upload and entry of the actual ad media into the multimedia advert database within the RTOO data center 45. Once the ad members of the campaign are entered, the user assigns each to a media channel with the select channel process 740. Once the media outlet channel is determined for a particular ad, the user can select from the permissible or possible alternatives the geographic location and also the time schedule for publishment or broadcast of the ad by performing a select location and schedule process 750.

The RTOO system allows the user to append a call-to-action message to an advertisement in order to increase brand recognition by viewers or the number of conversions to actual purchases for the advertiser by performing a generate real-time short code, schedule, region and other info process 470. Once the ad is fully configured in terms of channel, distribution location and schedule, and short code messages have been associated, the store: ad data process 490 is executed which stores the full configuration data in the RTOO data center 45.

FIG. 4 shows that during campaign optimization the real-time analytics process 440 is run in a loop with the update campaign process 430, so that data received from quantification of the advertisement's actual performance will enable an advertiser to increase the return on investment (ROI) for the ad by purchasing media more efficiently. In short, the advertiser will be able to make a better media purchase at the right time and the right place.

Figure 8:
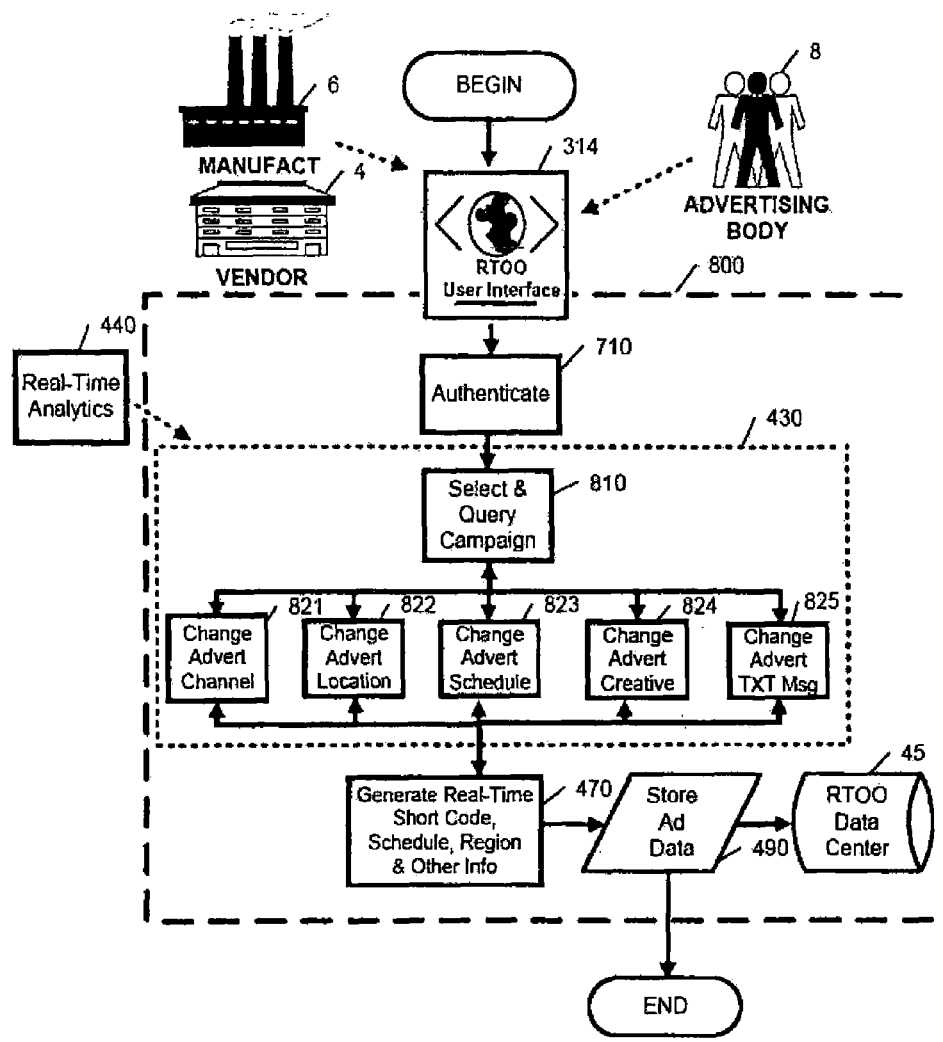
FIG. 8 is a process flow diagram illustrating, a method for management and update of an advertising campaign as performed within the real-time off-line ad optimization system.

FIG. 8 is a process flow diagram which illustrates a method of management of an advertising campaign as performed within an embodiment of the RTOO system whereby the data is analyzed and the results used to make adjustments to the campaign in real-time.

As shown in FIG. 8, the user can edit a campaign 800 from start to finish merely by performing an authentication process 710 followed by the update campaign process 430 as shown in FIG. 4. Then, similarly to a newly created campaign, as shown in FIG. 7, the ad, newly configured in terms of channel, distribution location and schedule, and short code messages is saved by performing the store ad data process 490 which stores the full configuration data in the RTOO data center 45.

As also shown in FIG. 8, in order to optimize the campaign, the method for campaign update makes use of the real-time analytics process 440 based on analysis of real-time viewer feedback. This involvement is not necessary when the user is merely making changes to the campaign scheduling or location for reasons independent of the viewer responses or campaign results. The update campaign process 430 consists of a number of sub-processes. The user performs a select and query campaign process 810 to choose the campaign and particular advert to be modified. The user then can use the system of the present disclosure to perform a change advert channel process 821, change advert location process 822, change advert schedule process 823, change advert creative process 824, or change advert text message process 825. The user typically performs a combination of these processes. While FIG. 8 depicts the one time usage of the analytical results to control the campaign adjustment, in actual operation it is expected that the real-time analytics process 440 and the update campaign process 430 will be run in reciprocal fashion until the user is satisfied with the improvements to the overall campaign configuration. At this point, the user stores the campaign configuration results as described above.

Figure 9:
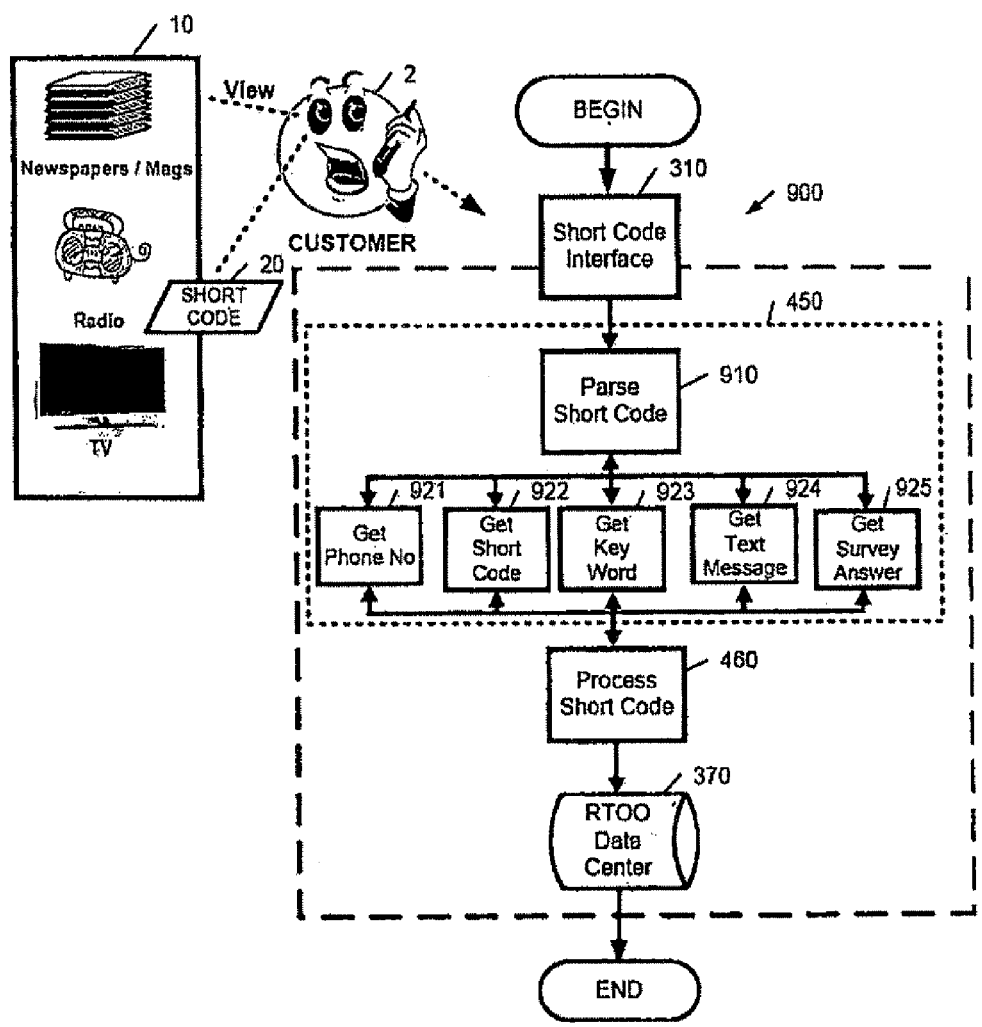
FIG. 9 is a process flow diagram illustrating a method for capturing response of viewers to an advertising campaign as performed within the real-time off-line ad optimization system.

The real-time off-line ad optimization system monitors, measures and analyzes the performance of an off-line advertisement by receiving clicks from viewers who opt in to request information or respond via a mobile phone's. SMS text messaging for example. This response data is captured within the RTOO data center. FIG. 4 shows the complete functionality and flow of the RTOO system for all including the capture of viewer response data. FIG. 9 is a process flow diagram illustrating a method of capturing response of viewers to an advertising campaign as performed within the real-time off-line ad optimization system or RTOO system 300. The process of a viewer interacting with the off-line ad enhances the advertisement itself, making it more effective in the viewer's mind. This feedback reinforcement process therefore drives a dual cycle which includes (1) providing incentives for the user to respond to in order to measure ad effectiveness, and (2) increasing the user's attention and further boosting ad efficiency.

As shown in FIG. 9, the viewer or customer 2 hears, reads, or scans an ad and decides to respond to the call-to-action in the ad message. The user performs a send short code process 290, as shown in FIG. 2. Next, as shown in FIG. 3 and in FIG. 9, the short code interface 310 module captures the user's forwarded message. The collect short code process 450, as shown in FIG. 9, takes the short code messages and performs a parse short code process 910. Once the message has been recognized and fields of the message have been and segmented, each of the constituent components are separated. In the preferred embodiment, a get phone number process 921, a get short code process 922, a get key word process 923, a get text message process 924, and a get survey answer process 925 each extract and interpret the text information in the corresponding portion of the message. In other embodiments, additional fields may be included in the short code message. In such eventuality, additional capability is included at this stage within the collect short code process 450 to process this field information embedded in the user response data. In this way, as short codes are used to support more varied or more complex viewer surveys, the RTOO system can handle such messages properly.

It is common in text messaging between mobile phone users, and even in computer based messaging conversations for abbreviations to become generally known or obvious especially to the receiver given their context of usage. For example, it is well understood that leaving the vowel letters out of spelled words does not detract significantly from the reader's understanding of written English language words. Therefore, in yet another embodiment, the customer or viewer 2 sends a short code with free form text and is empowered to adopt standard or even improvised abbreviations. In this case, the collect short code process 450 contains processing algorithms which can recognize and interpret abbreviated messages or messages which employ generally adopted abbreviations. In further embodiments, free form text messages can be parsed and interpreted based on general rules, accepted abbreviations, context, prior history of the responder, or other means.

The RTOO software may be centrally located and in that case the software will be scalable to support hundreds of thousands of simultaneous advertisers, agencies and publishers. For the server based implementation, users can login remotely through for example an interne connection. Alternatively, the software can be standalone and running on a user's personal computer. For either embodiment, the RTOO system will allow each of these entities or organizations to support hundreds of simultaneous campaigns.

The report generating or the real-time analysis module 360 is the software component that most clients will spend the bulk of their time with on a daily basis in order to optimize the campaign performance. The RTOO system offers multiple basic reports as well as the ability to send raw data to a standard file or spreadsheet format, for example Excel, or .xls. Standard reports include:

(1) Cost per Click (CPC) for media spend on an individual ad, group of ads or an entire campaign. This report calculates the cost of the media buy divided by the number of viewer clicks over a defined period of time. For example, if a full page daily ad in the NY times costs $10,000, and the number of unique viewers for that day is 1000, then the media CPC is $10.

(2) Cost per Click for mobile text messages. The cost per click for mobile text messages is the cost per text message sent by the advertiser plus the cost for receiving the text message divided by the number of unique viewer clicks. Cost for receipt of message is included in this calculation because carriers charge for messages both sent and received.

(3) Clicks or viewers per key word. Each keyword placed in an advertisement will receive a certain number of clicks from viewers. This report divides the number of clicks by key word.

(4) Clicks or viewers per key word by geographic region, (5) Clicks or viewers per key word by market segment such as health care, beauty, travel, and entertainment among others, (6) Clicks or viewers by key word by market and submarket segment such as beauty, luxury or hotels, economy, (7) Clicks or viewers by keyword and demographic profile such as area code, associated zip code, inferred median income, (8) CPC score based upon target market segment, (9) Percentage of target audience reached based upon last previous click, (10) Percentage of target audience reached based upon previous 100 clicks, (11) Percentage of target audience reached based upon entire click history, (12) CPC for one media campaign versus any other media campaign contained within the system. (13) A/B reporting CPC and number of viewers between two similar campaigns using identical keywords to determine ad effectiveness and overall value of one advertisement versus another advertisement, (14) Coefficient correlation or efficiency between many different campaigns but in the same market segment. This is a campaign co-efficiency report that shows the most efficient or effective campaign, and (15) Coefficient correlation or efficiency of two similar campaigns determined by identical market segment where viewers clicked on both campaigns.

Figure 10:
FIG. 10 shows a representative screen layout for a cost per click report generated by the real-time analysis module of the RTOO system in accordance with an embodiment of the present invention.
Figure 11:
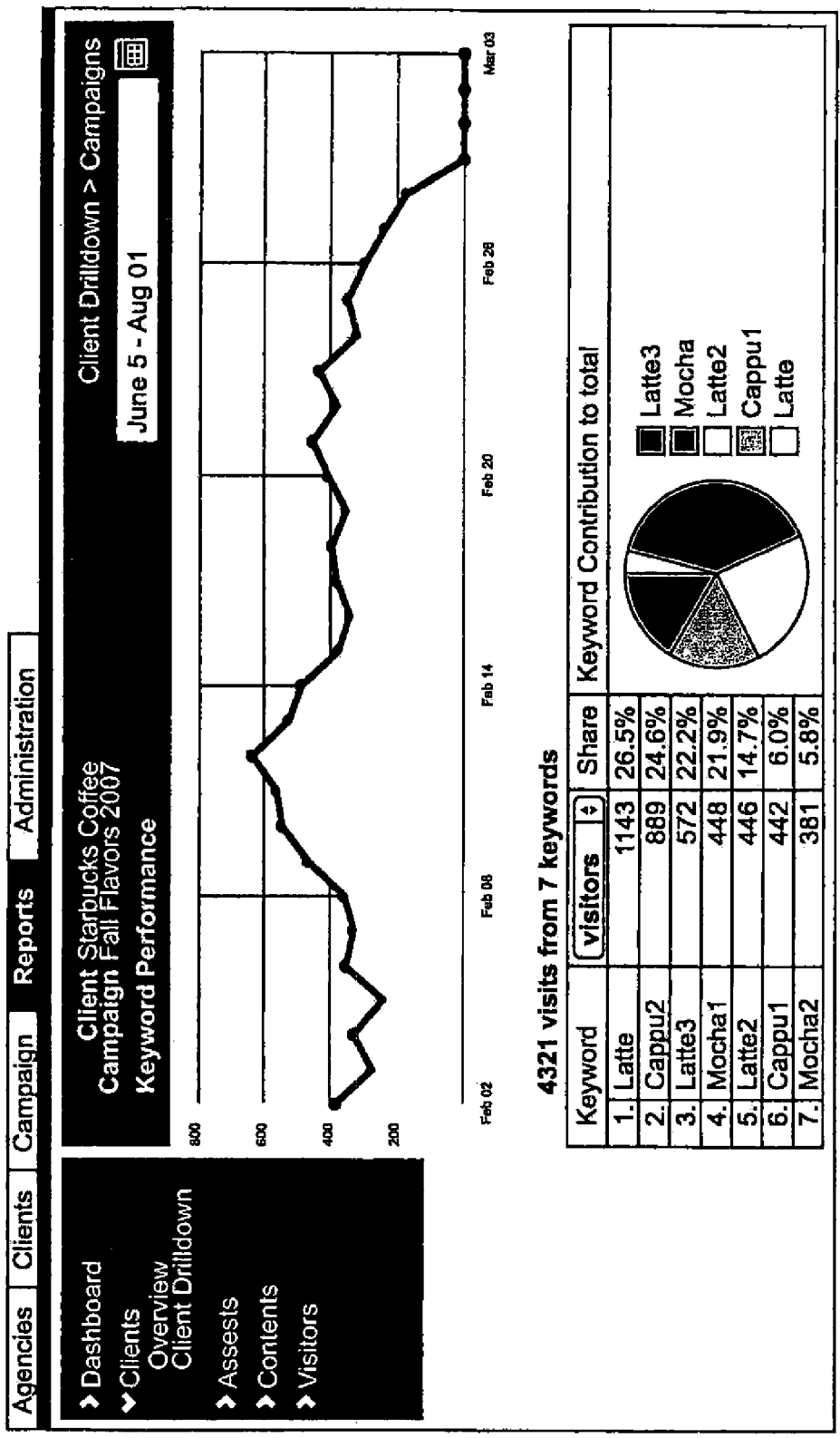
FIG. 11 shows a representative screen layout for a keyword performance report generated by the real-time analysis module of the RTOO system in accordance with an embodiment of the present invention.
Figure 12:
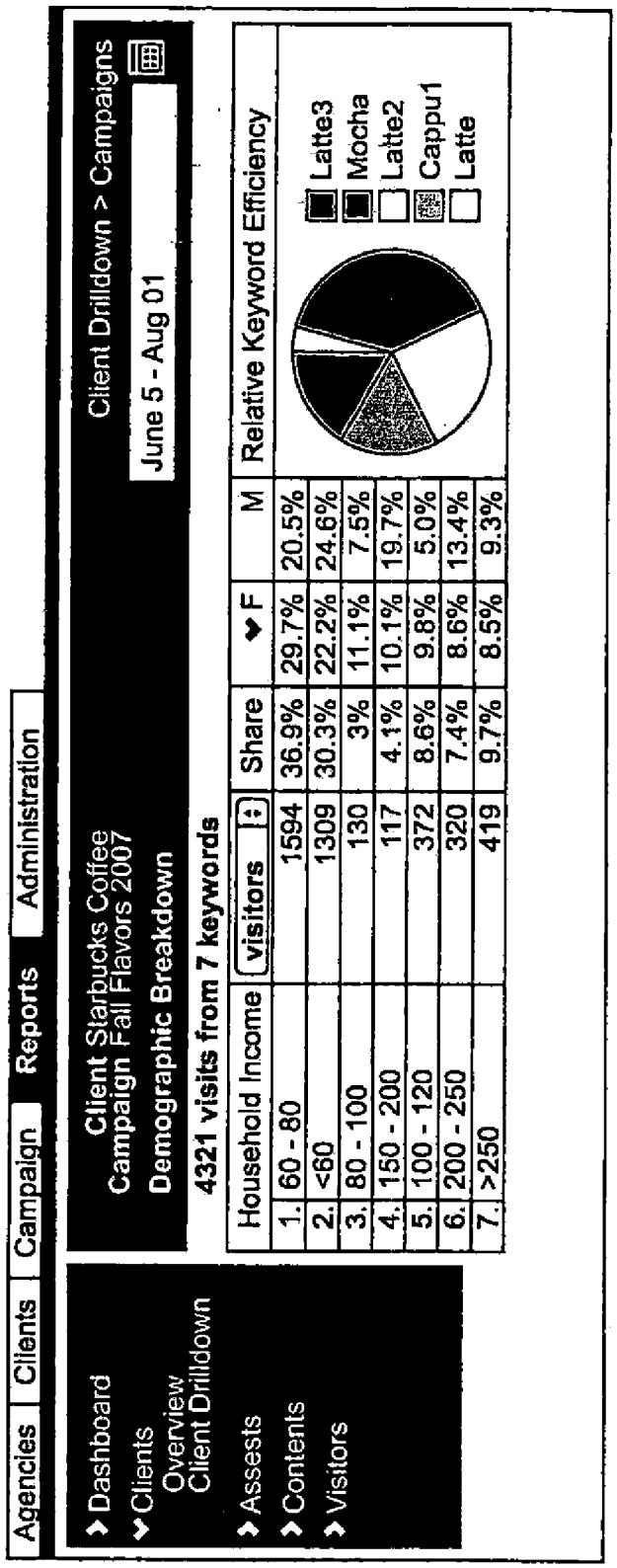
FIG. 12 shows a representative screen layout for a demographic breakdown report generated by the real-time analysis module of the RTOO system in accordance with an embodiment of the present invention.
Figure 13:
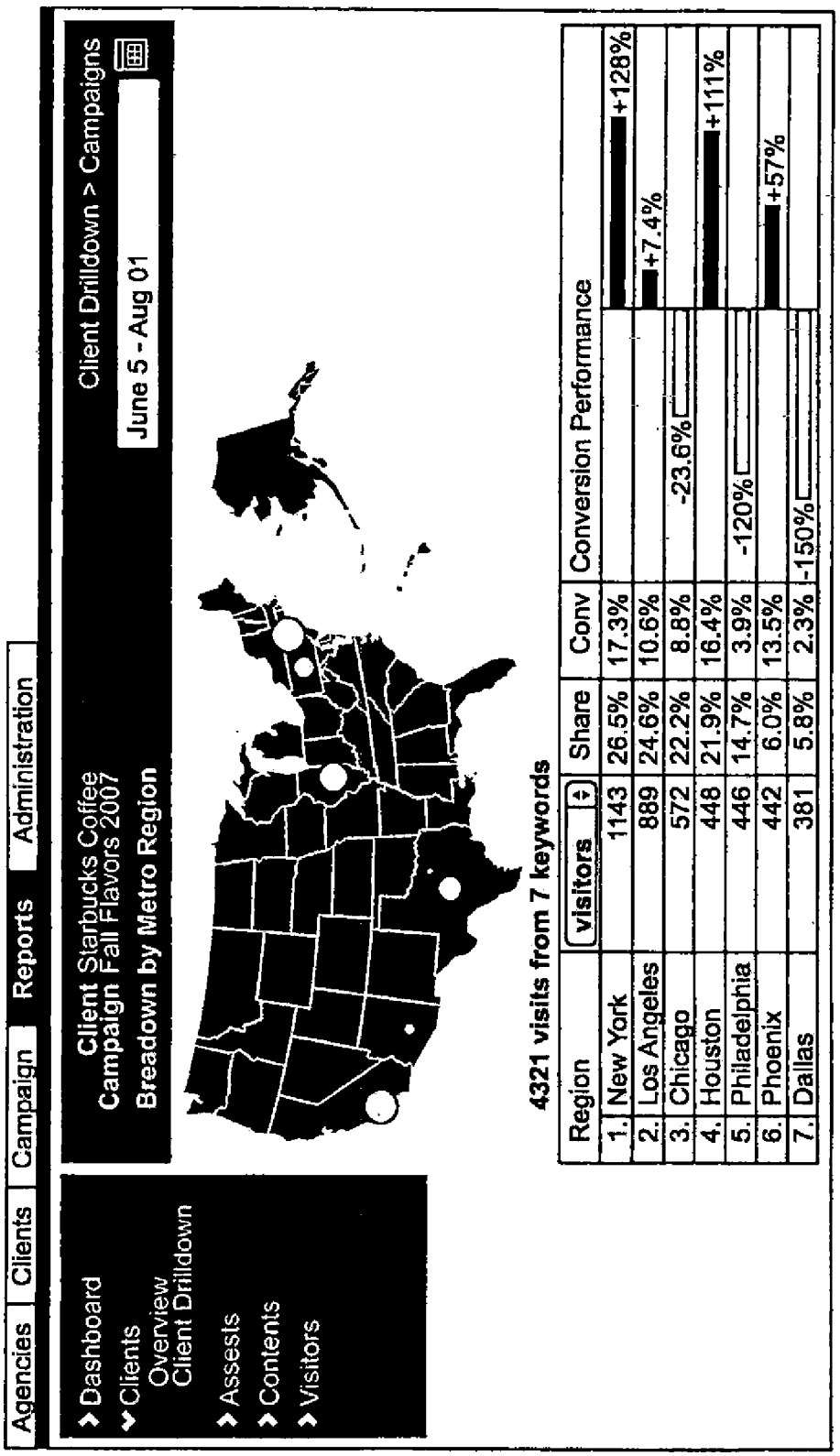
FIG. 13 shows a representative screen layout for a breakdown by metro region report generated by the real-time analysis module of the RTOO system in accordance with an embodiment of the present invention.

After the campaign launch, the analysis module 360 will be used to validate the efficacy of an ad as well as the performance of a test message campaign. FIGS. 10 to 13 show representative layouts for typical screens designs for the reports generated by the RTOO software system analysis module in accordance with an embodiment of the present invention. FIG. 10 shows a cost per click report, FIG. 11 shows a representative screen layout for a keyword performance report, FIG. 12 shows a representative screen layout for a demographic breakdown report, and FIG. 13 shows a representative screen layout for a breakdown by metro region report generated by the real-time analysis module 360 of the RTOO system.

The disclosed system has further capabilities beyond the standard reports enumerated above. The multiple abilities of the system to construct, conduct and analyze incentive based campaigns allow the user to create marketing experiments to most accurately assess viewer reactions to an advertisement. The advertiser uses the system to create and run comparable ads campaign with product specific and product unrelated incentives. Joint comparison of viewer response and of these kinds of experiments will make possible differential sentiment analysis and more accurate prediction of the true effectiveness of the ad on that particular media channel.

Figure 14:
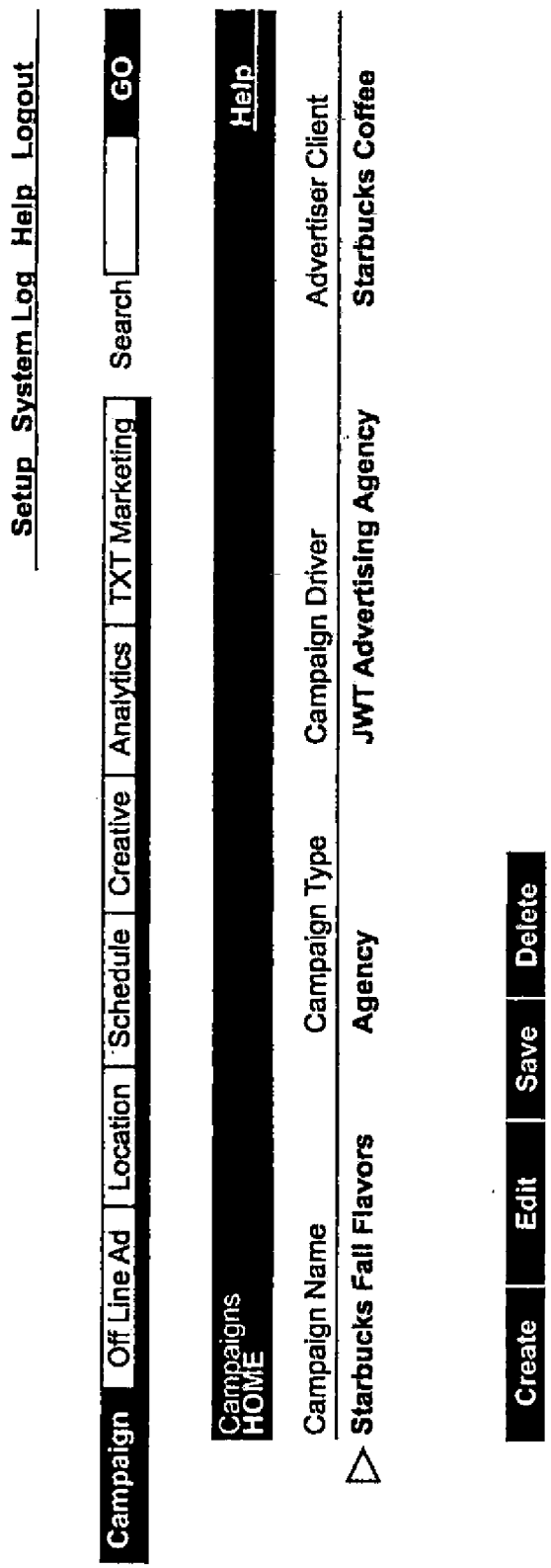
FIG. 14 shows a representative screen layout for creation of a new campaign as part of the campaign option of the graphical user interface for the RTOO system in accordance with an embodiment of the present invention.

The process flow for setup and creation of a new campaign is shown in FIG. 7. Representative screen layouts for the steps that the vendor 4, manufacturer 6, advertising body 8, or user encounter during these operations are shown in FIGS. 14 and 15. In a preferred embodiment of the present disclosure, the user logs into the system in a secure fashion. Then by clicking on a main screen tab of the graphical user interface, the user can select the campaign option of the RTOO system software. As shown in FIG. 14, the user selected the campaign option, and the software user interface displays the campaigns created by the user. The campaign name, campaign type, campaign driver, and advertiser client name are examples of the type of information displayed on this screen which uniquely identify and summarize the separate campaigns.

The client is a company or entity that owns a product or service that is being advertised in a particular media such as TV, radio, newsprint, magazines, or billboards. The advertiser or client is the ultimate buyer for an advertising campaign. However, there are some advertising agencies that buy media (i.e. TV commercial time or radio time) on behalf of their advertiser client. In these cases, the bill is ultimately paid for by the advertiser.

If the driver type is an agency, this is a company that represents the advertiser for the purpose of creating, planning, buying or measuring the performance of an advertisement or advertising campaign in any media.

The user can then select any particular campaign and by double clicking, or some other selection method, can access more detailed information regarding that individual campaign. For example, FIG. 15 shows a representative screen layout for facilitating entry of contact information for the creator of a new campaign. As shown, the user can enter their contact name, driver type, client name, campaign type, and email address and phone number for contact purposes. It is envisioned that a number of users of the software will be able to assist in the management of the campaign. The software thereby facilitates the coordination between the advertisers, advertising agencies, and publishers.

Once a particular campaign is created and selected as shown in FIGS. 14 and 15, in a preferred embodiment of the present disclosure, by clicking on another main screen tab of the graphical user interface, the user can select the off-line ad option of software of the RTOO system and can begin to enter the members to the overall group. Representative screen layouts are shown in FIGS. 16 and 17 for setup and configuration of a particular off-line ad. Once the user selects a particular campaign, the RTOO system software displays the complete list of adverts which comprise this campaign as shown in FIG. 16. This screen shows a representative layout for selection or entry of an off-line ad as a member of the selected campaign. As shown, this screen summarizes the campaign by showing for each constituent ad the advertisement name, type of ad, the publisher, market segmentation, the media buy, and the media cost.

The publisher is a company that is responsible for creating content in any media that is off-line. Publishers might include for example CBS television, as shown in the figure, the NY Times, Meredith Magazine Publishing or the Hearst magazine and newspaper companies. The type of ad includes for example TV, radio, newsprint, magazines, billboards, kiosks and all forms off line advertisements. This screen can also display other information such as total media cost thereby providing a summary overview of the complete campaign.

Once the user selects a particular advertisement, FIG. 17 shows a representative screen layout for user review of the off-line ads which are members of a campaign as part of the off-line ad menu option. The user can from this screen control the entry of the type of media advertisement that is being used (TV, radio, newsprint, billboard or outdoor), it's name, the publisher, the market and submarkets the campaign is geared to, the media buy, and the cost of that media buy. The menu at the bottom of this screen shows that the user can at any time create, delete, edit, and save the changes made to the off-line ad.

Figure 18:
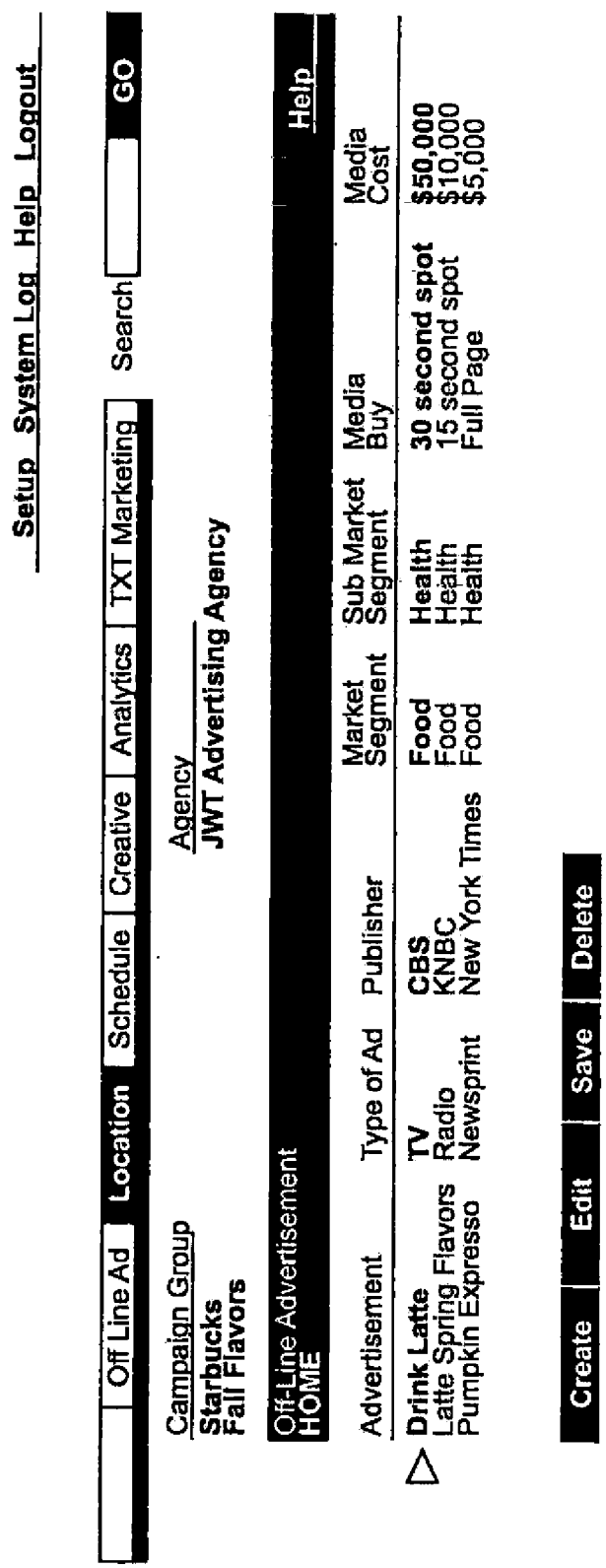
FIG. 18 shows a representative screen layout for review of the off-line ads which are members of a campaign as part of the location option of the graphical user interface for the RTOO system in accordance with an embodiment of the present invention.
Figure 19:
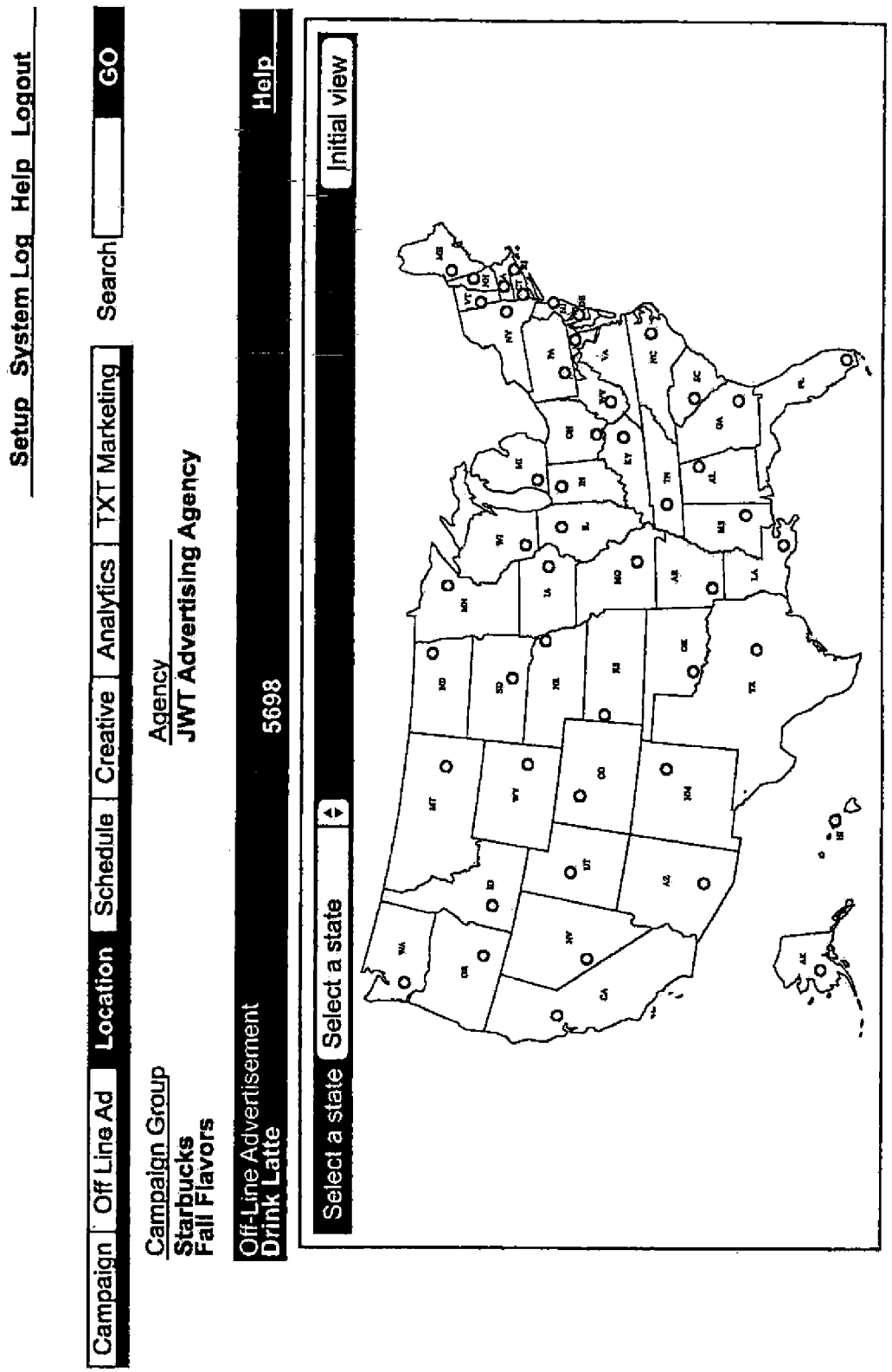
FIG. 19 shows a representative screen layout for review of the geographical location that an individual off-line ads is running in as part of the location option of the graphical user interface for the RTOO system in accordance with an embodiment of the present invention.

Once an ad campaign is created and its constituent ads are added as shown in FIGS. 14-17, the user can by clicking on another main screen tab of the RTOO system graphical user interface, select the location option of the software to configure the geographic distribution. Representative screen layouts are shown in FIGS. 18 and 19 for location selection. FIG. 18 shows a representative screen layout for selection of a particular off-line ad under the location option. Once a particular ad is selected from the screen in FIG. 18, FIG. 19 shows a representative screen layout for review of the actual geographical distribution for the coverage of an off-line ad. In this embodiment, a user can use normal click and drag mouse selection techniques to interact with the map directly. Configuration settings can be used to alter the significance of the coloration of the map displayed. For example, the darkness of the blue could signify percentage of state coverage or relative cost of coverage in that region. Alternative embodiments would allow interactive user determination of the significance of the map colorization.

Also, as shown in FIG. 19, the software provides the ability to use a pull down menu to select whole states to target for coverage. However, other embodiments support ad coverage selection by zip codes or area codes. Further embodiments provide the ability to configure for a single ad separate regions for alternate text messages. This capability allows alternative incentive plans to be tested for their effectiveness.

Figure 21:
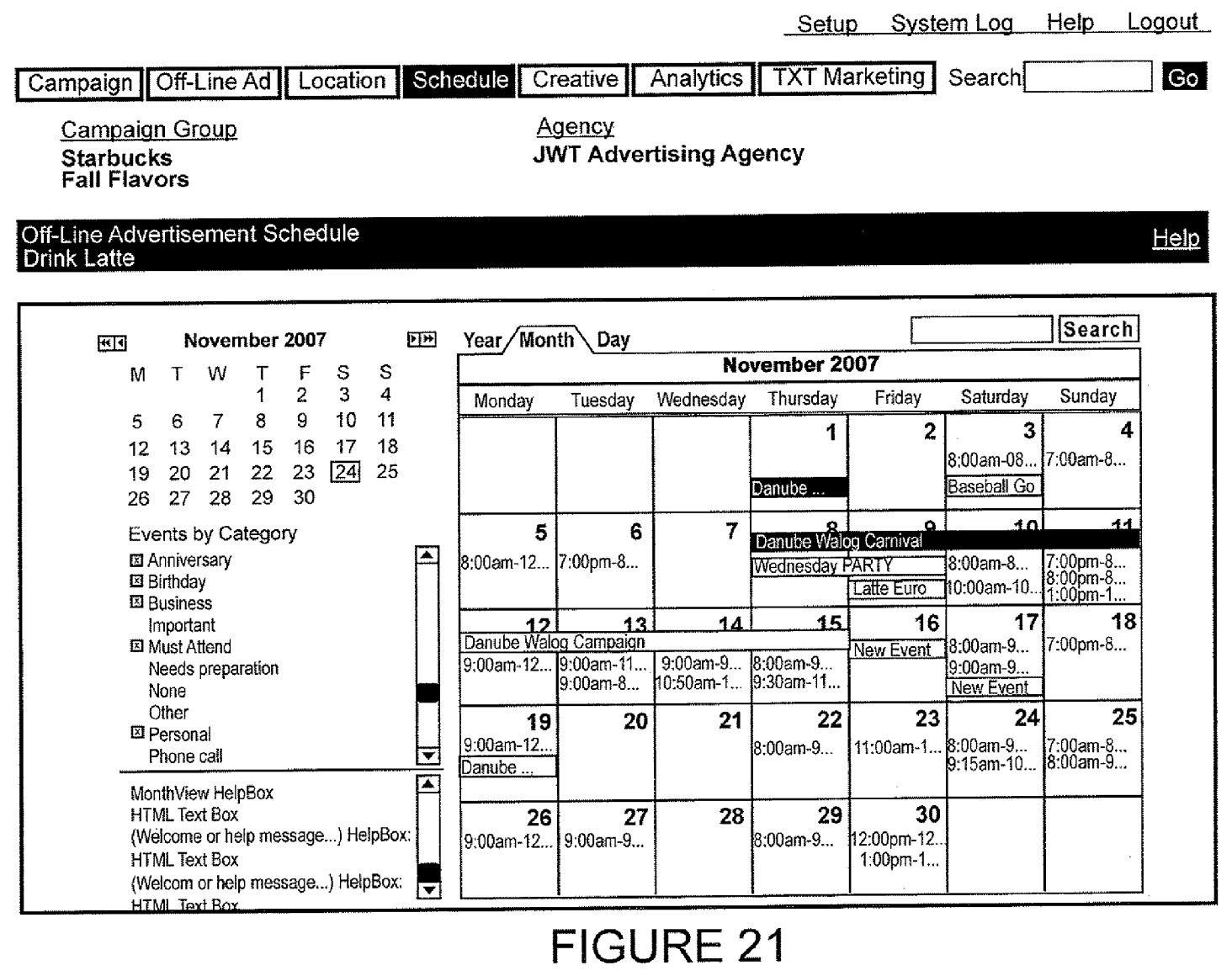

Representative screen layouts are shown in FIGS. 20 and 21 for schedule selection for the ads in a campaign. Once an ad campaign is created and its constituent ads are added, and location is selected as shown in FIGS. 14-19, the user can by clicking on another main screen tab of the graphical user interface, select the schedule option of software of the RTOO system. Under the schedule option, once a particular off-line ad is selected in FIG. 20, FIG. 21 shows a representative screen layout that permits scheduling and review of the calendar that an individual off-line ad is running as part of the location option of the graphical user interface for the RTOO system in accordance with an embodiment of the present invention. The type of information shown in the display would be the name of the campaign, the advertisement name, and the month by month calendar detailing the publishing or broadcast of the selected advert. As shown in FIG. 21, the setting of the scheduling could be by double click on an individual date or by click and drag on groups of days, weeks, or even months. As has become common with calendar based scheduling programs, in the preferred embodiment, the option is made available for the user to also create an event and select a cycle period of recurrence.

Figure 23:
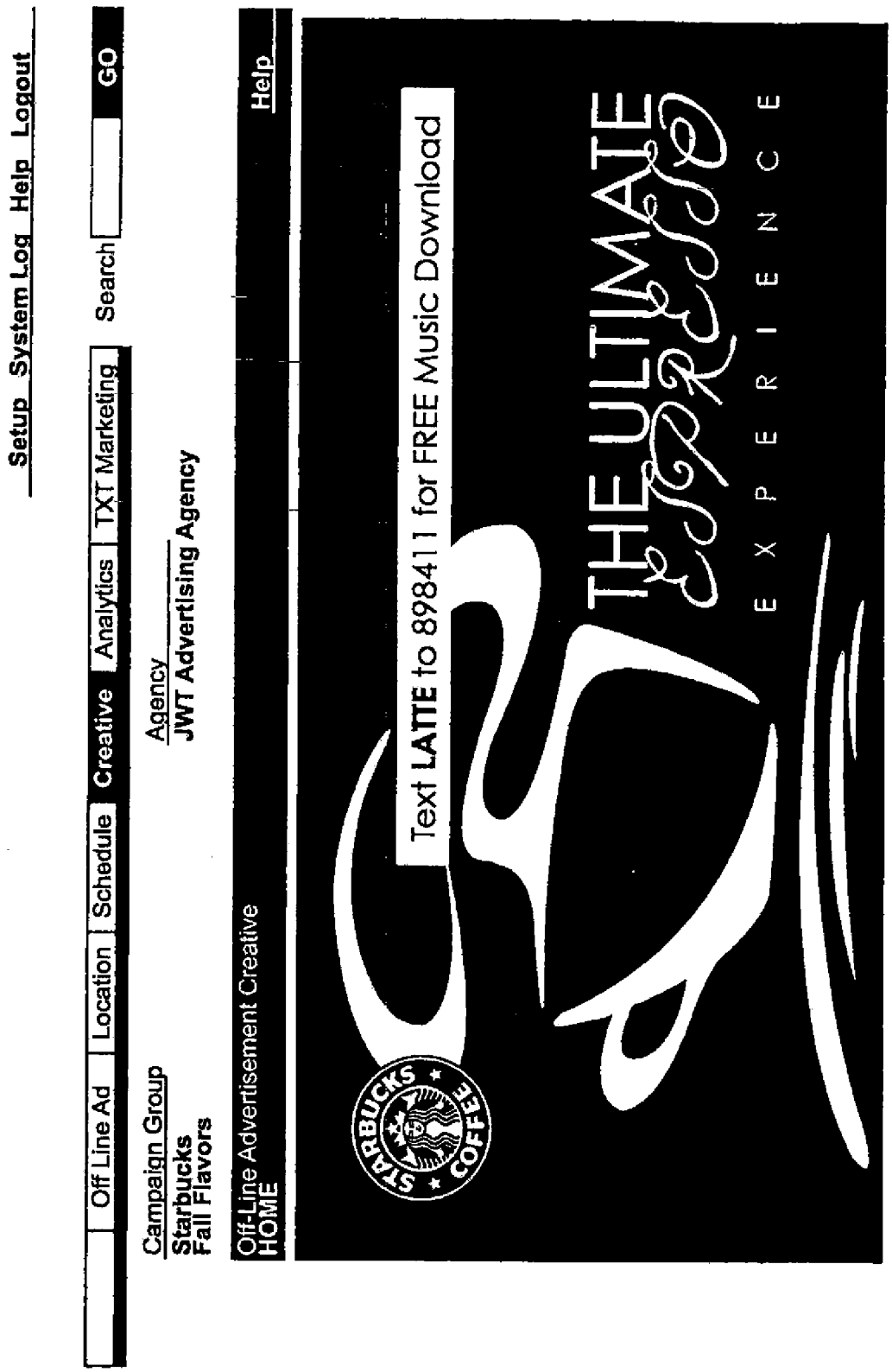
FIG. 23 shows a representative screen layout for review of the off-line ad itself as available under the creative content option of the graphical user interface for the RTOO system in accordance with an embodiment of the present invention.

Once an ad campaign is created, and its constituent ads are selected, and location and schedule are determined as shown in FIGS. 14-21, the user can by clicking on another main screen tab of the graphical user interface, select the Creative option for the software of the RTOO system in order to review the entry of the actual creative media for the ads in a campaign. Under the Creative option, once a particular off-line ad is selected in FIG. 22, the full layout for review of the content of an individual off-line ad is displayed as in FIG. 23. Also as shown in FIG. 23, the text message is overlaid on the image exactly as it is scheduled to appear as a member of the text message marketing campaign. This key step for visualization of media content with the call-to-action or short text overlay in place facilitates the final assessment of the complete advertising product in the process of creating, testing, launching and measuring a mobile text marketing advertisement or campaign.

FIG. 23 is a representative example illustrating how a text message is appended to ads for a coffee maker product type. Every kind of product could have a text message and associated call-to-action. For example, in an ad for (1) an mp3 player, the viewer can be instructed to text the message with the name of the mp3 player to the specified number in order to receive a free song, (2) a new car, the viewer can be instructed to text the message with the name of the auto model to the specified number in order to receive a free test drive, or (3) a credit card, the viewer can be instructed to text the message with the name of the card company to the specified number in order to receive a free credit report.

In a preferred embodiment, within the real-time off-line ad campaign optimization software as service framework, after verification by the user of the final creative, text overlay and schedule and location changes, the complete and updated media package is sent via email to the appropriate party within the corresponding media channel. Alternatively, other means may be established that ensure quick and secure communication of the updated ad media and updated schedule and location requests to the appropriate media channels. These methods may be unique to each channel. For example, the publisher of a monthly magazine does not need to be apprised or check and respond to requested updates for a campaign as quickly as a daily newspaper publisher. It is expected that each media channel type will require and then establish its own standards for communication between themselves and the disclosed system.

Although standalone mobile text marketing approaches exist which broadcast unsolicited information to mobile subscribers, the exemplary RTOO software requires that viewers first opt in and respond to a call-to-action which is placed on any off-line advertisement. There are any number of different types of call-to-action campaigns with eight enumerated above, but in its simplest iteration a call-to-action would consist of a message, a key word and an SMS short code. FIG. 24 shows a representative screen layout for entry of the text message and information messages and other pertinent information to be associated with a particular short code as available under the TXT Marketing option of the graphical user interface for the RTOO system in accordance with an embodiment of the present invention.

As shown in FIG. 24, the creator or user can indicate the type of text marketing message that is being sent as well as the message itself. For example, is the text message can be for a promotion, discount, game, vote, or coupon. The user can configure the start and end date for the text message, and physically attach the creative content from this location in the software. This is the point at which the text message itself is entered which announces the call-to-action to the viewer. As is common in text messaging software, the program will keep track of the character count and display the count to assist the user in composing the message.

This screen also allows the user to enter the stop text message which a viewer or customer send to unsubscribe from an SMS mail list or stop unwanted SMS messages. To unsubscribe or stop SMS messages the viewer replies to the received message with 'STOP'. This prevents any further unwanted messages. This capability serves to reduce the cost and time of handling SMS spam complaints for the advertising body. The stop message will be sent back to the viewer by the RTOO system so that the viewer is assured that their request to end communication from the sender will be honored.

The help text message is also entered by the system user. The help text message is the message that is sent in response by the system when the viewer replies to the received message with 'HELP'. As shown in FIG. 24, the user can also enter message instructions. These can for example be special instructions to the media channel which are not included in any of the other fields. Or they can be instructions for internal use between team members working on the ad campaign.

In a preferred embodiment, the text message status can be controlled from this location in terms of limiting the campaign to a certain sample size. FIG. 24 shows that a field with which keeps track of total messages can be used to allow the user to set the number of messages to the campaign will be run until reached. The messages used will display a running tally of responses received to date. Alternatively these fields could signify the various number of alternative text messages that are associated with the same key word. The screen in FIG. 24 can be used to keep track of the number of permitted alternative text messages, and the running number of alternative messages currently used. In preferred embodiments, the number of text messages being used is counted and the billing characteristics will be defined in a billing module of the disclosed system. For example, the text messages can be pre-paid with a 90 day running count. The software can then provide notification when the count is running low so that a creator can purchase more text messages.

Once the text message ad campaign is fully configured, the campaign is then tested. A quick test allows the user to verify that the messaging is working as intended. The real-time off-line ad campaign optimization software makes it convenient to restrict deployment to a specific and limited geographic region or schedule. After successful testing the full campaign is launched.

All of these examples serve to illustrate the kind of advantages gained by an advertisement which is associated with a call-to-action or text message request generated according to the embedded ad messaging process of the present disclosure. In addition to the standard ad content, an ad with overlay informs the viewer that they can receive an incentive for a text message response. The process of responding by the viewer immediately has the effect of reinforcing the value of the ad and gets the viewer to specifically concentrate on the company or product name. The physical and mental exercise of typing the name of the company or the product imprints this information on the viewer's memory. The disclosed system and methods therefore take advantage of recently discovered principles of psychological reinforcement to improve the attitude of the viewer towards the advertisement.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

General Call to Action (CTA)

Although one embodiment of the system uses a short code attachment as a means for a customer to provide a response to the ad, not all customers are in a position to respond to advertisement campaigns with use of a cell phone. For example, not every cell phone user has paid extra fees for the expanded functionality required to support text messaging. Therefore in order to permit participation by the largest number of customers the solicitation to text message short codes is expanded to include capability for the viewer or customer to respond to a general call-to-action (CTA) with an ad specific promotion code among other information to be entered at the ad publishers website.

For the purpose of this disclosure, in order to provide more general functionality over prior art, and as an alternative to a short code, in cases where the viewer or customer chooses not to use a device with text messaging capability, the customer will be provided with what is termed here a "promo code". It should be noted that, for the purpose of this disclosure, the "short code" terminology and technology can be replaced by the term of "promo code" whenever it appears.

In one embodiment, promo codes are to be used by the customer at web sites, such as advertiser or publisher web sites. The web site can be accessed by any web enabled device, including computers, PDA's, web enabled cell phones, Smart-Phones, and the like. The generalized CTA that the present invention utilizes does not rely upon text messaging. In implementing a promo code, the publisher of the advert provides a website to which the viewer is invited to navigate. This web site may be a web site of the publisher, of the provider of the goods or services being advertised, or by a third party that implements the system on behalf of participating parties. Once at the web site, the customers will be directed or linked to a promotions web page which solicits the login of the user. Then, upon entry of the promo code the customer has full access to the offered special promotions. In addition, the system contemplates the use of email messages, bulletin board messages, SMS messages, Twitter messages, social network communications and other communications in a way that allows the customer to respond to the advert. Further, the system contemplates the use of other response mechanisms, including any optical mechanism such as QR (Quick Response) codes and the like, wireless mechanisms such as RFID codes and the like, and/or sound based response mechanisms such as audio response and the like, and image based response mechanisms such as video or still image transmission.

It should also be understood that a purchase of the offered goods may also be considered a response in gauging the effectiveness of an advert. The system contemplates reporting from POS (point-of-sale) locations to supplement the data from the advert as part of the feedback loop.

Figure 26:
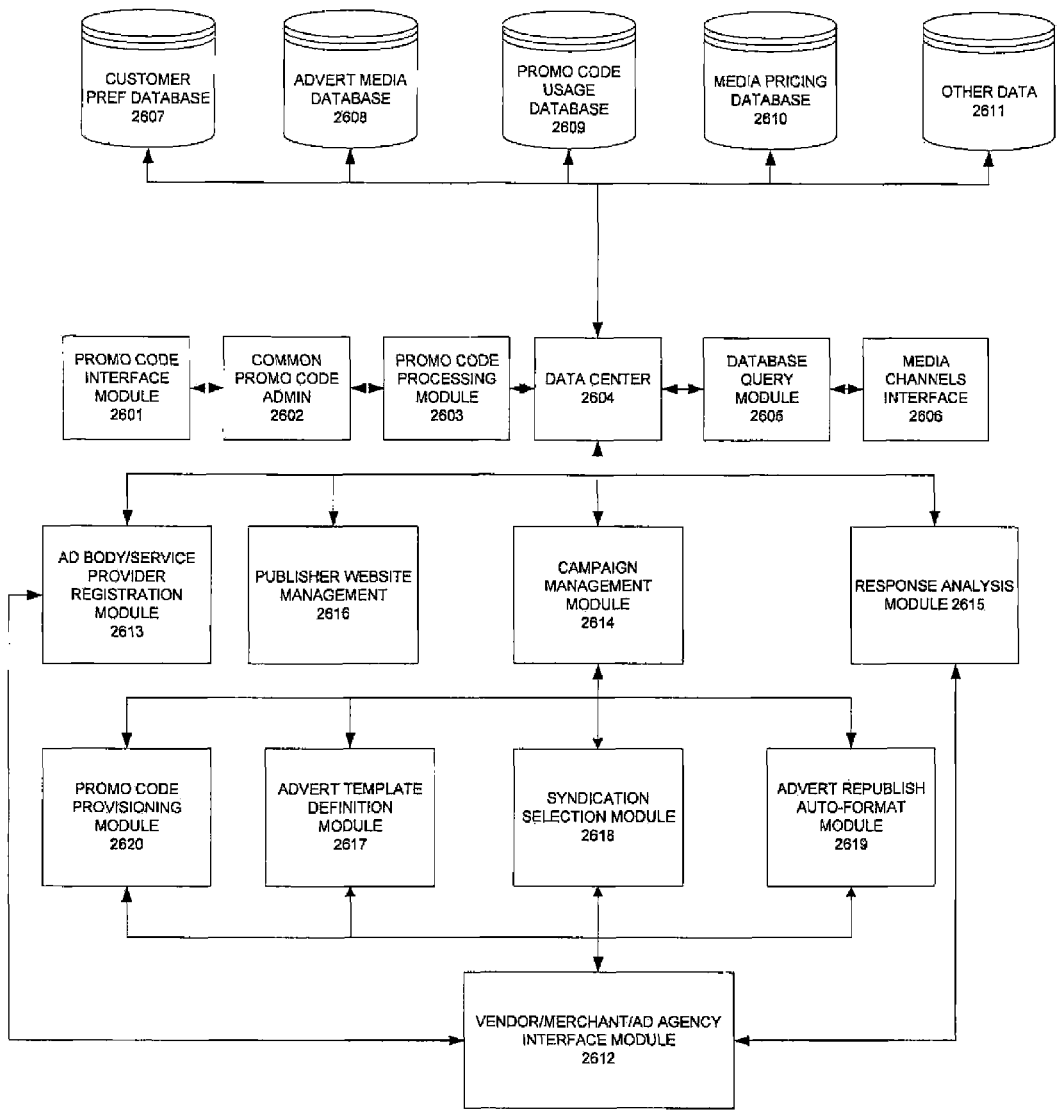
FIG. 26 is a block diagram illustrating an embodiment of the call to action system.

FIG. 26 is a block diagram illustrating the promo code embodiment of the system. The embodiment of the system includes a promo code interface module 2601 a common promo code administrations interface module 2602, a promo code processing module 2603, a data center 2604, a database query processing module 2605, and a media channels interface module 2606. The data center 2604 is coupled to a plurality of databases including a customer preference database 2607, an advert media database 2608, a promo codes usage database 2609, a media pricing database 2610, and other database 2611.

The system further includes a vendor/merchant or advertising body user interface module 2612, a good or service provider or advertising body registration module 2613, an advertising campaign management module 2614, a response analysis module 2615, including, a publisher website management module 2616, and a promo code provisioning module 2620.

The system may also includes several additional modules, which make new functions possible for the cooperative publishing or syndication of advertisements. These include advert template definition capture module 2617, which assists the overall system operator to collect essential information from merchants to be contained in their advertisement and associated special offer, syndication selection interface 2618, which allows a source publisher to set parameters for other publishers that intend to syndicate the advertisement, and advert republish auto-format module 2619, which allows any member publisher in the network to selected adverts to republish the on their website and promote using their own traditional media channels.

On-Line Call to Action

The system provides for a general call to action that can be satisfied by a plurality of approaches, all of which will allow the consumer to respond to the advert in a flexible manner. In one embodiment, the response to the call to action can be through email, SEM, SEO, a web site (publisher, merchant, third party, etc), social media site, and the like. When a consumer responds, the system tallies that response and uses it to analyze the effectiveness of the advert. The system collects all the information that is available in the response, including the timing of the response, the avenue of the response, the off-line format from which the response was generated, and, where available, registered user information. As noted above, the system may be implemented in a system where responders are (or become upon responding) registered users, or it can be implemented where none of the responders are registered users, or it can be a hybrid of registered and unregistered users.

Figure 27:
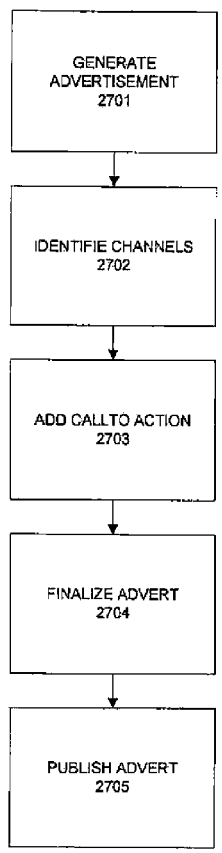
FIG. 27 is a flow diagram illustrating the generation of an advert campaign with a general call to action.

FIG. 27 is a flow diagram illustrating the generation of an advert with an embedded call to action. At step 2701 the user (i.e. publisher, merchant, creative, etc.) generates an advert. At step 2702 the user identifies the channel for the advert. This can be any of a number of off-line formats, including, but not limited to, print (newspaper, magazine, billboard, circular, and the like), television, radio, pre-movie ad, and the like. It should be noted that the system provides a new manner of tracking the effectiveness of off-line adverts, the system is not limited to such and may in fact combine off-line and online formats (email, social networks, affiliates, paid and free search engine, etc.).

At step 2703 the user adds a call to action to the advert. In one embodiment, the call to action may be customized or include some identifier so that any response to the call to action can be associated with the particular off-line format to publish the advert. In other words, the system will be able to differentiate a response to a call to action from a print ad from a response to a call to action to a radio spot. In another embodiment, the call to action can have some manner of identifying the response so that the system can identify the particular off-line format publisher and the time of day (or day of week) of the advert to which a response is provided. This can be as simple as modifying a promo code that is used by the consumer in responding to the advert and/or providing dedicated web addresses for each off-line format in which an advert is presented.

At step 2704 the system finalizes the adverts and they are published on schedule at step 2705.

Figure 28:
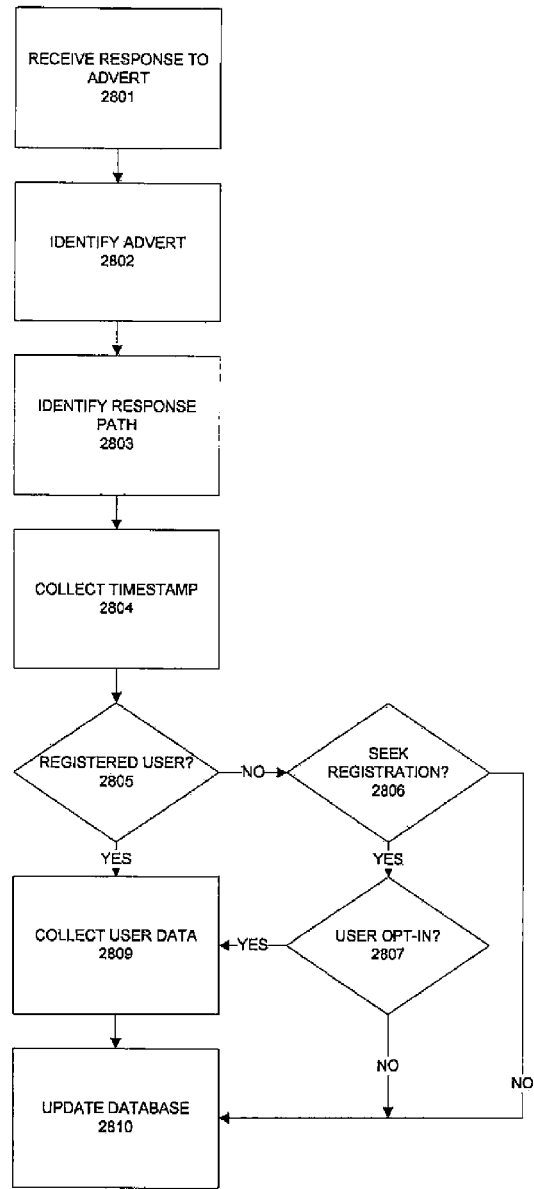
FIG. 28 is a flow diagram illustrating the operation of the system when receiving a response to an advert.

FIG. 28 is a flow diagram illustrating the operation of the system in a receiving a response to a general call to action. At step 2801 the system receives a response from a user. At step 2802 the system analyzes the response to determine the advert to which the consumer is responding. As noted above, this can be via decoding the promo code that is used by the consumer to consummate the response. At step 2803 the system identifies the response path. This can be via cell phone, voice mail, messaging, email, web site, social media, and the like. At step 2804 the system collects the time stamp information of the response. This allows the system to analyze how quickly the consumer has responded to the advert which is one gauge of the effectiveness of the advert.

At decision block 2805 the system determines if the user is a registered user. (Note in some embodiments, the consumer must register or sign in contemporaneously with responding to the ad). If not, the system proceeds to decision block 2806 to determine if the system should seek the registration of the consumer. In some campaigns, the merchant or publisher may prefer to require (or at least ask for) registration of the user. This can provide additional demographic information about the consumer that is very useful in measuring ad effectiveness. In other campaigns, the merchant or publisher might not require any registration in the hopes of increasing the number of responses.

If registration is sought at step 2806, the system proceeds to step 2807 to determine if the consumer has opted in to the registration process. If so, and if the user was registered at step 2805, the system proceeds to step 2809 and collects the user data associated with the responder. After step 2809, and if there is no desire to seek registration and/or no opt-in by the consumer responder, the system updates the database with all available information.

Call to Action

The call to action in an advert can be any offer or incentive designed to draw a response from a consumer of the advert. Such offers can include, but are not limited to, discounts, coupons, membership points, access to events or services, and the like. One type of call to action that can be used in the present system is known as a "Daily Deal" (DD). Each media advertisement provides identification or promo codes for use by the Consumers when they execute transactions to obtain their DD. In this fashion, effectiveness of the various media channels can be accurately assessed and moreover, immediate revenue is generated for both the publishers and advertisers. Subsequently if a Merchant is involved to facilitate Consumer redemption of the DD, these Merchants will likewise experience an increase in sales and market traffic.

Often a DD will require that the consumer purchase the DD offer, typically at a meaningful discount, in return for goods or services valued at greater than the amount paid for the DD. This allows not only accountability for the effectiveness of adverts, but financial benefit as well.

Based on the responses received from consumers, the system can modify campaign strategy as described with respect to FIG. 8 above, with the substitution of promo codes and general call to action for the short codes.

Figures 30, 31:
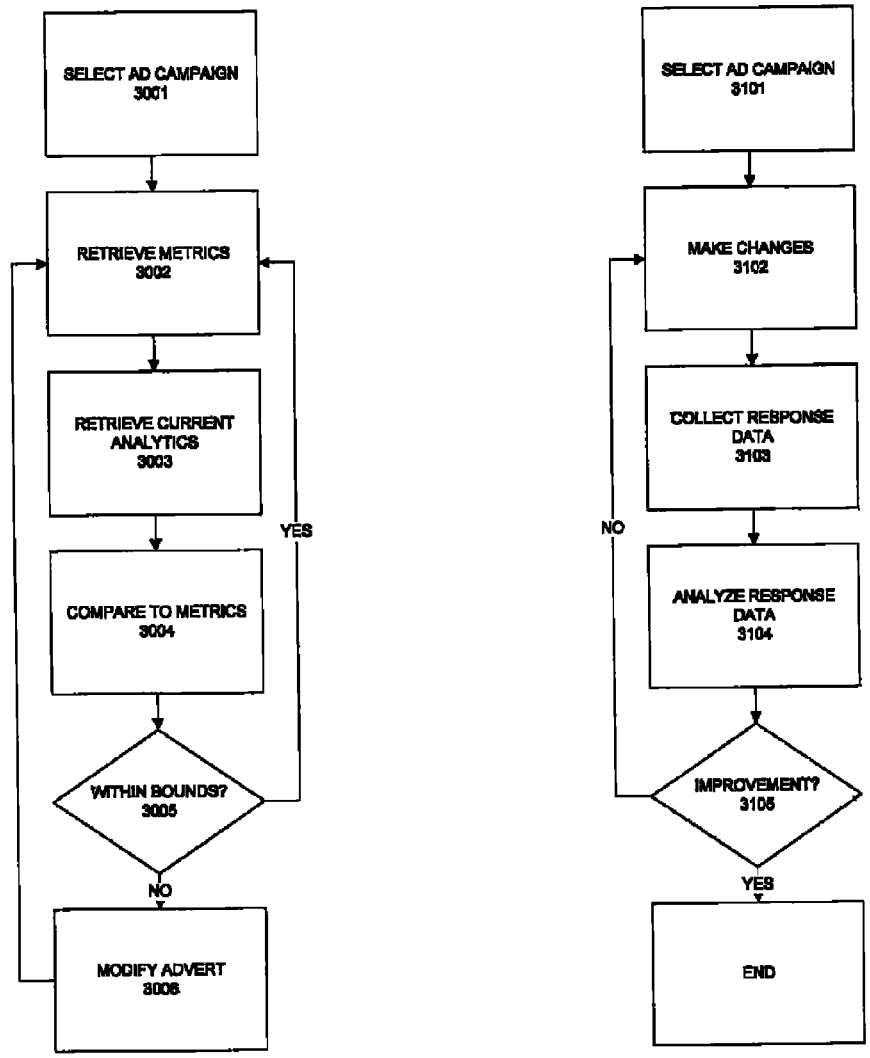
FIG. 30 is a flow diagram illustrating the operation of an embodiment of the system.
FIG. 31 is a flow diagram illustrating the operation of an embodiment of the system in modifying an ad campaign.

An example the operation of the promo code embodiment is illustrated in the flow diagram of FIG. 30. At step 3001 a user selects an ad campaign for analysis. At step 3002 the system retrieves the metrics for that ad campaign. The metrics are data points that the user has selected to determine the effectiveness of the campaign. The metrics may include sales, ad penetration, responses, response times, channel of response, channel of off-line advert, and the like. At step 3003 the system retrieves current analytic data acquired by the system. At step 3004 the current analytic data is compared to the metrics. At decision block 3005 it is determined if the data is within bounds of the metrics established for the campaign. If not, the advert campaign is modified at step 3006. The modification can include channels of delivery, times of day, change of creative, change of location, and the like. After changing the advert campaign, monitoring continues at step 3002.

FIG. 31 is a flow diagram illustrating the operation of another embodiment of the system. At step 3101 a user selects an ad campaign for analysis. At step 3102 the user makes changes to the advertising campaign. Such changes can include channels of delivery, location, time of day, creative change, and/or the avenue of response of viewers of the ad. At step 3103 the system collects response data, including sales and/or responses to the general call to action. At step 3104 the system analyzes the response data. At decision block 3105 it is determined if the changes produced an improvement in ad effectiveness. If so, the system ends at step 3106. If not, the system returns to step 3102.

Embodiment of Computer Execution Environment (Hardware)

Figure 29:
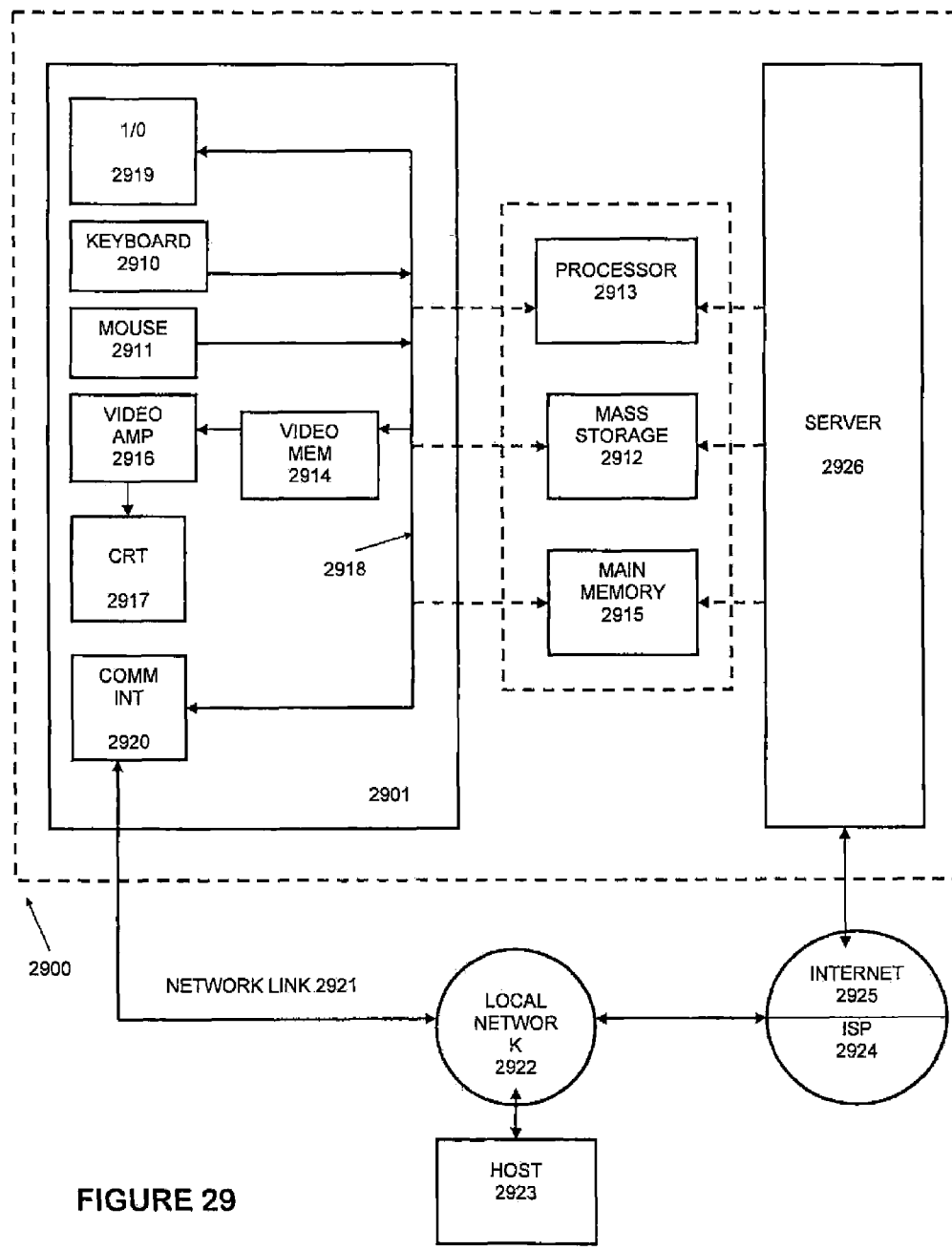
FIG. 29 is an example computer system for implementing an embodiment of the system.

An embodiment of the system can be implemented as computer software in the form of computer readable program code executed in a general purpose computing environment such as environment 2900 illustrated in FIG. 29, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 2910 and mouse 2911 are coupled to a system bus 2918. The keyboard and mouse are for introducing user input to the computer system and communicating that user input to central processing unit (CPU 2913. Other suitable input devices may be used in addition to, or in place of, the mouse 2911 and keyboard 2910. I/O (input/output) unit 2919 coupled to bi-directional system bus 2918 represents such I/O elements as a printer, A/V (audio/video) I/O, etc.

Computer 2901 may include a communication interface 2920 coupled to bus 2918. Communication interface 2920 provides a two-way data communication coupling via a network link 2921 to a local network 2922. For example, if communication interface 2920 is an integrated services digital network (ISDN) card or a modem, communication interface 2920 provides a data communication connection to the corresponding type of telephone line, which comprises part of network link 2921. If communication interface 2920 is a local area network (LAN) card, communication interface 2920 provides a data communication connection via network link 2921 to a compatible LAN. Wireless links are also possible.

In any such implementation, communication interface 2920 sends and receives electrical, electromagnetic or optical signals which carry digital data streams representing various types of information.

Network link 2921 typically provides data communication through one or more networks to other data devices. For example, network link 2921 may provide a connection through local network 2922 to local server computer 2923 or to data equipment operated by ISP 2924. ISP 2924 in turn provides data communication services through the world wide packet data communication network now commonly referred to as the "Internet" 2925 Local network 2922 and Internet 2925 both use electrical, electromagnetic or optical signals which carry digital data streams. The signals through the various networks and the signals on network link 2921 and through communication interface 2920, which carry the digital data to and from computer 2900, are exemplary forms of carrier waves transporting the information.

Processor 2913 may reside wholly on client computer 2901 or wholly on server 2926 or processor 2913 may have its computational power distributed between computer 2901 and server 2926. Server 2926 symbolically is represented in FIG. 29 as one unit, but server 2926 can also be distributed between multiple "tiers". In one embodiment, server 2926 comprises a middle and back tier where application logic executes in the middle tier and persistent data is obtained in the back tier. In the case where processor 2913 resides wholly on server 2926, the results of the computations performed by processor 2913 are transmitted to computer 2901 via Internet 2925, Internet Service Provider (ISP) 2924, local network 2922 and communication interface 2920. In this way, computer 2901 is able to display the results of the computation to a user in the form of output.

Computer 2901 includes a video memory 2914, main memory 2915 and mass storage 2912, all coupled to bi-directional system bus 2918 along with keyboard 2910, mouse 2911 and processor 2913.

As with processor 2913, in various computing environments, main memory 2915 and mass storage 2912, can reside wholly on server 2926 or computer 2901, or they may be distributed between the two. Examples of systems where processor 2913, main memory 2915, and mass storage 2912 are distributed between computer 2901 and server 2926 include thin-client computing architectures and other personal digital assistants, Internet ready cellular phones and other Internet computing devices, and in platform independent computing environments, The mass storage 2912 may include both fixed and removable media, such as magnetic, optical or magnetic optical storage systems or any other available mass storage technology. The mass storage may be implemented as a RAID array or any other suitable storage means. Bus 2918 may contain, for example, thirty-two address lines for addressing video memory 2914 or main memory 2915. The system bus 2918 also includes, for example, a 32-bit data bus for transferring data between and among the components, such as processor 2913, main memory 2915, video memory 2914 and mass storage 2912. Alternatively, multiplex data/address lines may be used instead of separate data and address lines.

In one embodiment of the invention, the processor 2913 is a microprocessor such as manufactured by Intel, AMD, Sun, etc. However, any other suitable microprocessor or microcomputer may be utilized. Main memory 2915 is comprised of dynamic random access memory (DRAM). Video memory 2914 is a dual-ported video random access memory. One port of the video memory 2914 is coupled to video amplifier 2916. The video amplifier 2916 is used to drive the cathode ray tube (CRT) raster monitor 2917. Video amplifier 2916 is well known in the art and may be implemented by any suitable apparatus. This circuitry converts pixel data stored in video memory 2914 to a raster signal suitable for use by monitor 2917. Monitor 2917 is a type of monitor suitable for displaying graphic images.

Computer 2901 can send messages and receive data, including program code, through the network(s), network link 2921, and communication interface 2920. In the Internet example, remote server computer 2926 might transmit a requested code for an application program through Internet 2925, ISP 2924, local network 2922 and communication interface 2920. The received code maybe executed by processor 2913 as it is received, and/or stored in mass storage 2912, or other non-volatile storage for later execution. In this manner, computer 2900 may obtain application code in the form of a carrier wave. Alternatively, remote server computer 2926 may execute applications using processor 2913, and utilize mass storage 2912, and/or video memory 2915. The results of the execution at server 2926 are then transmitted through Internet 2925, ISP 2924, local network 2922 and communication interface 2920. In this example, computer 2901 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

What is claimed is:

1. A method for management and optimization of an off-line ad campaign comprising:
   in an off-line computer-implemented ad optimization system;
   using a campaign management processing module to generate an off-line ad having a defined call to action embedded within the off-line ad, wherein the defined call to action includes an incentive provided in exchange for performing the call to action and completing a customer survey;
   using a customer survey response processing module to collect customer survey response data to the defined call to action;
   using an analysis processing, module to compute a measure of ad effectiveness based on the customer response data;
   using the campaign management processing module to make adjustments to the off-line campaign based on data from the analysis module.

2. The method of claim 1 wherein the defined call to action comprises a promo code.

3. The method of claim 2 wherein the call to action comprises a short code.

4. The method of claim 2 wherein the call to action comprises a web site.

5. The method of claim 2 wherein the call to action comprises an email address.

6. The method of claim 2 wherein the call to action comprises an RFID readable device.

7. The method of claim 2 wherein the call to action comprises a QR code.

8. The method of claim 2 wherein the call to action comprises a social media message system.

9. The method of claim 2 wherein the call to action comprises a bulletin board message system.

10. The method of claim 2 further including associating a customer response with a time and channel of off-line ad presentation.

* * * * *